(12) United States Patent  
Yasui

(10) Patent No.: US 7,788,876 B2  
(45) Date of Patent: Sep. 7, 2010

(54) BUILDING MATERIAL, BUILDING AND METHOD FOR CONTROLLING THE INDOOR ENVIRONMENT IN A BUILDING

(75) Inventor: Ichirou Yasui, Tokyo (JP)

(73) Assignee: Asahi Glass Green-Tec Co., Ltd., Tokyo (JP)

( * ) Notice: Subject to any disclaimer, the term of this patent is extended or adjusted under 35 U.S.C. 154(b) by 107 days.

(21) Appl. No.: 11/757,596

(22) Filed: Jun. 4, 2007

(65) Prior Publication Data

US 2007/0277451 A1 Dec. 6, 2007

(30) Foreign Application Priority Data

Jun. 5, 2006 (JP) .............................. 2006-156420

(51) Int. Cl.
*E06B 7/00* (2006.01)

(52) U.S. Cl. ......................... 52/741.1; 52/2.22; 52/222; 52/90.1; 52/171.3; 428/428; 454/185; 236/44 R; 236/44 A; 236/44 C; 47/17; 62/150

(58) Field of Classification Search .................. 52/14, 52/2.22, 13, 63, 86, 90.1, 222, 1, 741.1, 171.3; 428/428; 454/185; 236/44 R, 44 A, 44 C; 359/237, 509, 512; 47/17; 62/150

See application file for complete search history.

(56) References Cited

U.S. PATENT DOCUMENTS

| | | | | | |
|---|---|---|---|---|---|
| 735,856 | A | * | 8/1903 | Boggs ........................ | 236/44 R |
| 1,781,153 | A | * | 11/1930 | Allen ............................. | 73/73 |
| 2,553,302 | A | * | 5/1951 | Cornwall ..................... | 237/56 |
| 2,584,988 | A | * | 2/1952 | Dember ........................ | 374/28 |
| 2,601,905 | A | * | 7/1952 | Anderegg ..................... | 96/144 |
| 3,016,801 | A | * | 1/1962 | Kaspar ........................ | 359/886 |
| 3,265,371 | A | * | 8/1966 | McGrath ..................... | 261/27 |
| 3,446,272 | A | * | 5/1969 | Gaines, Jr. ................... | 165/229 |
| 3,464,400 | A | * | 9/1969 | Wellman ..................... | 126/113 |
| 3,464,401 | A | * | 9/1969 | McGrath ..................... | 126/113 |
| 3,981,294 | A | * | 9/1976 | Deminet et al. ............. | 126/633 |
| 4,004,380 | A | * | 1/1977 | Kwake ........................ | 52/2.18 |
| 4,006,856 | A | * | 2/1977 | Nilsson ....................... | 126/591 |
| 4,020,989 | A | * | 5/1977 | Kautz .......................... | 126/616 |
| 4,047,328 | A | * | 9/1977 | Kehl et al. ................... | 47/59 R |
| 4,093,352 | A | * | 6/1978 | Pisar .......................... | 359/886 |
| 4,108,373 | A | * | 8/1978 | Chiapale et al. ............. | 126/640 |

(Continued)

FOREIGN PATENT DOCUMENTS

DE 28 53 268 A1 6/1980

(Continued)

*Primary Examiner*—Robert J Canfield  
*Assistant Examiner*—Matthew J Gitlin  
(74) *Attorney, Agent, or Firm*—Oblon, Spivak, McClelland, Maier & Neustadt, L.L.P.

(57) ABSTRACT

A building material comprises a plurality of transparent sheet layers, adjacent transparent sheet layers of which are disposed so as to have a gap interposed therebetween; and a vapor supply system for supplying humidified air into the gap between the adjacent transparent sheet layers. A building including the above-mentioned building material. A method for controlling the indoor environment in a building including the above-mentioned building material comprises supplying humidified air into the gap between adjacent transparent sheet layers; and generating dew condensation on a gap-side surface of the adjacent transparent sheet layers.

21 Claims, 12 Drawing Sheets

U.S. PATENT DOCUMENTS

| | | | | |
|---|---|---|---|---|
| 4,122,828 A | * | 10/1978 | DiPeri | 126/671 |
| 4,150,551 A | * | 4/1979 | Eisler | 62/281 |
| 4,183,398 A | * | 1/1980 | Ehrke | 165/53 |
| 4,197,991 A | * | 4/1980 | D'Amato | 236/44 A |
| 4,215,672 A | * | 8/1980 | Chiapale et al. | 126/640 |
| D258,080 S | * | 1/1981 | D'Amato | D23/356 |
| 4,269,170 A | * | 5/1981 | Guerra | 126/619 |
| 4,291,674 A | * | 9/1981 | Comte et al. | 126/592 |
| 4,324,289 A | * | 4/1982 | Lahti | 165/48.2 |
| 4,365,620 A | * | 12/1982 | Bliamptis | 126/633 |
| 4,369,765 A | * | 1/1983 | McDaniel | 126/572 |
| 4,380,994 A | * | 4/1983 | Seemann | 126/633 |
| 4,382,436 A | * | 5/1983 | Hager | 126/630 |
| 4,387,533 A | * | 6/1983 | Green et al. | 47/17 |
| 4,462,459 A | * | 7/1984 | Schmidlin | 165/54 |
| 4,478,210 A | * | 10/1984 | Sieradski | 126/570 |
| 4,515,150 A | * | 5/1985 | McGlew et al. | 126/621 |
| 4,577,619 A | * | 3/1986 | Howe, Jr. | 126/629 |
| 4,621,614 A | * | 11/1986 | Sykes, Jr. | 126/617 |
| 4,622,950 A | | 11/1986 | Greenbaum | |
| 4,649,902 A | * | 3/1987 | De shen | 126/636 |
| 4,658,559 A | * | 4/1987 | Doherty | 52/463 |
| 4,658,806 A | * | 4/1987 | Boozer | 126/703 |
| 4,676,434 A | * | 6/1987 | Johnson | 237/1 R |
| 4,711,294 A | * | 12/1987 | Jacobs et al. | 165/230 |
| 4,773,190 A | | 9/1988 | Reade | |
| 4,928,425 A | * | 5/1990 | Walker et al. | 47/18 |
| 4,936,060 A | * | 6/1990 | Gelinas et al. | 52/1 |
| 5,001,859 A | * | 3/1991 | Sprung | 47/17 |
| 5,184,600 A | * | 2/1993 | Astle, Jr. | 126/113 |
| 5,233,843 A | * | 8/1993 | Clarke | 62/271 |
| 5,613,333 A | * | 3/1997 | Witzig, Jr. | 52/200 |
| 5,700,559 A | * | 12/1997 | Sheu et al. | 428/319.7 |
| 5,761,864 A | * | 6/1998 | Nonoshita | 52/302.3 |
| 6,178,966 B1 | * | 1/2001 | Breshears | 126/702 |
| 6,284,383 B1 | * | 9/2001 | Nishiyama | 428/430 |
| 6,499,309 B1 | * | 12/2002 | Yeh | 62/235.1 |
| 7,028,685 B1 | * | 4/2006 | Krecke | 126/633 |
| 7,240,458 B2 | * | 7/2007 | Ishisaki | 52/2.22 |
| 7,328,886 B2 | * | 2/2008 | Mockry et al. | 261/112.1 |
| 7,337,615 B2 | * | 3/2008 | Reidy | 62/3.4 |
| 2002/0011075 A1 | * | 1/2002 | Faqih | 62/285 |
| 2002/0073628 A1 | * | 6/2002 | Dextras | 52/1 |
| 2003/0087049 A1 | * | 5/2003 | Hachenberg et al. | 428/34.1 |
| 2003/0116443 A1 | * | 6/2003 | Maruyama et al. | 205/637 |
| 2003/0145729 A1 | * | 8/2003 | Klemic | 95/148 |
| 2003/0188477 A1 | * | 10/2003 | Pasternak et al. | 47/17 |
| 2007/0084460 A1 | * | 4/2007 | Beckman | 126/625 |
| 2008/0017499 A1 | * | 1/2008 | Brockhoff | 203/11 |
| 2008/0202498 A1 | * | 8/2008 | Ramos | 126/626 |
| 2009/0025711 A1 | * | 1/2009 | Edwards et al. | 126/704 |

FOREIGN PATENT DOCUMENTS

| | | | |
|---|---|---|---|
| EP | 1 637 031 A1 | | 3/2006 |
| JP | 9-234829 | | 9/1997 |
| JP | 2001261382 A | * | 9/2001 |
| JP | 2004-81205 | | 3/2004 |
| WO | WO 00/77316 A1 | | 12/2000 |

* cited by examiner

----- temperature °C   --- RH%

--- relative illuminance   —— illuminance (Lux)

- - - - - temperature °C   - - - RH%
- - - relative illuminance   ——— illuminance (Lux)

- - - - - temperature °C   - - - RH%
- - - relative illuminance   ——— illuminance (Lux)

BUILDING MATERIAL, BUILDING AND METHOD FOR CONTROLLING THE INDOOR ENVIRONMENT IN A BUILDING

TITLE OF THE INVENTION

BACKGROUND

I. Technological Field

The present invention relates to a building material, a building and a method for controlling the indoor environment in a building.

II. Description of Related Art

Conventional houses for cultivating plants, such as greenhouses, have been configured to have a roof, a wall or the like formed from a transparent sheet, such as a transparent plastic sheet or a glass sheet.

Plant cultivation has tended to be done in a large scale, which has made such houses for cultivating plants larger.

Such houses for cultivating plants, in particular large-sized houses for cultivating plants, are required to improve durability, a thermal insulation property, ease in maintenance and the like.

It has been proposed to form a roof, a wall or the like from a combination of two transparent plastic films in order to build a house having an excellent thermal insulation property. For example, JP-A-2004-81205 has proposed a roof wherein two transparent plastic films are formed in a bag-like structure and are fixed to a ridgepole or the like to provide a bag-like structure, and air is supplied into the bag-like structure to stretch the bag-like structure tight. A building using such a roof can supply warm air in the bag-like structure forming the roof, easily melting snow piled on the roof and easily keeping the indoor area warm.

In houses for cultivating plants, it has been prevalent that a shade curtain is put therein to block excessive light from entering from outside mainly in the summer. With regard to such a shade curtain, various proposals have been made (see JP-A-9-234829).

However, such a shade curtain needs to dispose a device for opening and closing the curtain in the house. Such a shade curtain, which constantly exists in the house, produces a shade, which make the amount of light nonuniform between a shaded portion and an unshaded portion, with the result that the qualities or the growing levels of cultivated plants are made different in some cases. Such a shade curtain and the device opening and closing the curtain require maintenance. For these reasons, it has been demanded to develop a light-blocking system, which has a simpler structure and makes it difficult to make the amount of light nonuniform indoors.

Further, such houses for cultivating plants have been demanded to realize indoor environments (such as an amount of light, a temperature and a humidity) suited for plants under such circumstances that cultivated plants are diversified and that the qualities sought for plants (such as the colors and the tastes of vegetables or flowers) are diversified. In particular, the control of the amount of light is important since the amount of light has a great impact on plants. However, the above-mentioned shade curtain is difficult to finely control the amount of light since only two-stage control of blocking or unblocking light can be made.

BRIEF SUMMARY

The present invention is proposed in consideration of the above-mentioned circumstances. It is an object of the present invention to provide a building material capable of controlling the amount of light entering a building, a building including such a building material, and a method for controlling the indoor environment in a building including such a building material.

The present inventor has completed the present invention by finding, as a result of extensive investigation, that humidified air is introduced into the gap between adjacent transparent sheet layers disposed through the gap, and dew condensation is caused on a transparent sheet surface.

Specifically, according to a first aspect of the present invention, there is provided a building material comprising a plurality of transparent sheet layers, adjacent transparent sheet layers of which are disposed so as to have a gap interposed therebetween; and a vapor supply system for supplying humidified air into the gap between the adjacent transparent sheet layers.

According to a second aspect of the present invention, there is provided a building including the building material defined according to the first aspect.

According to a third aspect of the present invention, there is provided a method for controlling the indoor environment in a building including the above-mentioned building material, which comprises supplying humidified air into the gap between adjacent transparent sheet layers; and causing dew condensation on a gap-side surface of the adjacent transparent sheet layers.

In accordance with the present invention, it is possible to provide a building material capable of controlling the amount of light entering a building, a building including such a building material, and a method for controlling the indoor environment in a building including such a building material.

DETAILED DESCRIPTION

Building Material And Building

Figure 1:
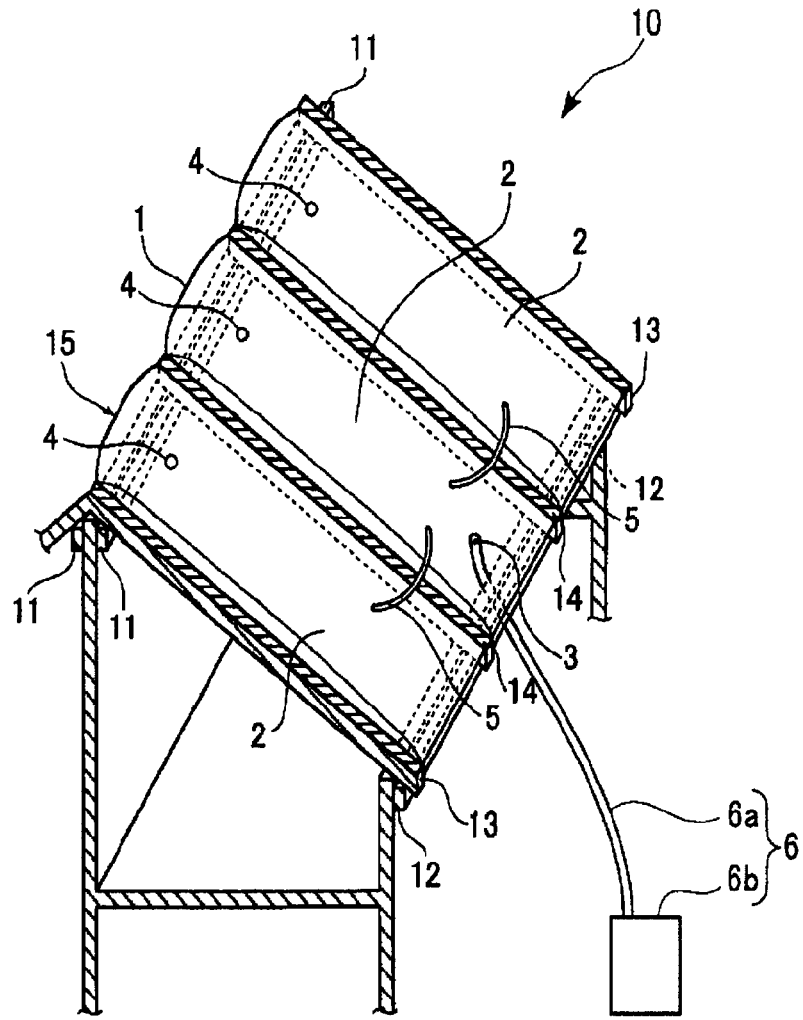
FIG. 1 is a perspective view showing the building according to an embodiment of the present invention, which includes the building material according to the present invention.

The building material according to the present invention includes a plurality of transparent sheet layers disposed so as to have a gap interposed between adjacent transparent sheet layers, and a vapor supply system for supplying humidified air in the gap between the adjacent transparent sheet layers.

In Description and Claims, the phrase "a plurality of transparent sheet layers disposed so as to have a gap interposed between adjacent transparent sheet layers" means that adjacent transparent sheet layers are partly or entirely unbonded together. In the present invention, it is sufficient that the gap between adjacent transparent sheet layers is configured so as to be capable of forming a space when introducing a gas, such as air, into the gap. In the present invention, the gap does not necessarily have a visible space formed therein before introduction of a gas.

The phrase "humidified air" means air that contains vapor in such an amount that when the humidified air is filled in the gap, the vapor pressure in the gap is higher than the saturated vapor pressure at the lowest temperature in the environment where the building material is disposed (such as the outdoor temperature of the building).

In the above-mentioned structure, when humidified air is supplied into the gap between adjacent transparent sheet layers, vapor is filled in the gap, and condensation is caused on gap-side of adjacent transparent sheet layers, exhibiting a light-blocking effect.

The transparent sheets forming the transparent sheet layers may be basically composed of a material to allow light to pass therethrough (optically transparent material). The transparent sheets may contain, e.g., a known additive to such a degree that the object of the present invention is not damaged.

Each of the transparent sheets may be in the form of a film or the form of a plate.

Examples of the material to allow light to pass therethrough include a transparent resin and glass.

It is preferred that the transparent sheets comprise at least one selected from a group consisting of a transparent plastic sheet containing a transparent resin, and a glass sheet.

It is preferred that the transparent plastic sheets contain a thermoplastic resin, such as a fluororesin, a polyvinyl chloride resin, a polyester resin, a polyethylene resin, an ethylene/vinyl acetate copolymer (hereinbelow, abbreviated as EVA), polyethylene terephthalate (hereinbelow, abbreviated as PET), an acrylic resin, and polycarbonate (hereinbelow, abbreviated as PC). When the transparent plastic sheets contain such a thermoplastic resin, the transparent plastic sheets can be melt-bonded by heat, which is advantageous.

Each of the transparent plastic sheets may comprise a single transparent resin layer or a laminated sheet composed by laminating a plurality of transparent resin layers having different compositions. An example of the laminated sheet is a three-layer film composed by laminating a polyethylene resin layer, an EVA layer and a polyethylene resin in this order. It is also preferred that the laminated sheet comprise a laminated film having four layers, five layers or more layers.

It is preferred in terms of transparency, mechanical strength, weatherability, resistance to UV light, heat resistance, melt-bonding property or the like that the transparent resin comprise a fluororesin.

Examples of the fluororesin include an ethylene/tetrafluoroethylene copolymer (hereinbelow, abbreviated as ETFE), a hexafluoropropylene/tetrafluoroethylene copolymer (hereinbelow, abbreviated as FEP), a perfluoro(alkyl vinyl ether)/tetrafluoroethylene copolymer (hereinbelow, abbreviated as PFA), a tetrafluoroethylene/hexafluoropropylene/vinylidene fluoride copolymer (hereinbelow, abbreviated as THV), polyvinylidene fluoride, a vinylidene fluoride/hexafluoropropylene copolymer, and polyvinyl fluoride.

It is preferred in terms of being excellent in transparency, mechanical strength, heat resistance, etc. that the fluororesin comprise at least one selected from a group consisting of ETFE, FEP and THV. It is more preferred that ETFE be selected.

The transparent sheet layer may be subjected to surface treatment.

Such surface treatment may be a known treatment, such as hydrophilic treatment, stain-repellent treatment and water-repellent treatment.

It is preferred that the surface of the interior-side outermost layer of a building made of the building material according to the present invention be subjected to hydrophilic treatment. By this arrangement, when dew condensation is caused on the transparent sheet surface based on the moisture in the interior of the building, the droplets made of such dew condensation are likely to flow on the sheet surface. As a result, it is possible to reduce an adverse effect that a droplet drops on a plant to hinder the growth of the plant in, e.g., a house for cultivating plants.

It is preferred to carry out such hydrophilic treatment by a method for using an applicator to coat a solution of an inorganic colloid, a hydrophilic resin, a metal oxide or the like, a method for spraying a solution of an inorganic colloid, a hydrophilic resin, a metal oxide or the like, or a method for sputtering a metal oxide, such as a silicon oxide, tin oxide and titanium oxide.

In the building material according to the present invention, it is preferred that the plural transparent sheet layers include a transparent sheet layer having at least one surface subjected to no hydrophilic treatment, and that the at least one surface subjected to no hydrophilic treatment be disposed so as to face the gap.

When the surface of a transparent sheet layer facing the gap (the gap-side surface) comprises a surface subjected to no hydrophilic treatment, dew condensation is likely to be caused on the gap-side surface, improving the light-blocking effect, in comparison with a case where the gap-side surface comprises a surface subjected to hydrophilic treatment. Further, the dew condensation caused by humidified air can be held on the gap-side surface for a long period of time, with result that the duration of the light-blocking effect increases.

Although two gap-side surfaces have contact with a single gap, it is preferred that at least one of the two gap-side surfaces comprise a surface subjected to no hydrophilic treatment in the present invention.

In the present invention, it is possible to control the light-blocking rate by selectively forming a gap-side surface as a surface subjected to no hydrophilic treatment or a surface subjected to hydrophilic treatment. For example, the light-blocking effect increases as the number of gap-side surfaces subjected to no hydrophilic treatment increases.

When a transparent sheet layer comprises a resin having a low hydrophilic property, such as a fluororesin, it is particularly effective that the gap-side surface of the transparent sheet layer comprises a surface subjected to no hydrophilic treatment. In this case, the transparent sheet surface has a low hydrophilic property (high water-repellent property), making dew condensation easier.

In each of the transparent sheet layers according to the present invention, the gap-side surface has a water contact angle of preferably 60 deg or above, more preferably at least 80 deg and further preferably at least 100 deg (wherein the measurement was made by using a contact angle meter, Model CA-X, manufactured by KYOWA INTERFACE SCIENCE CO., LTD. at a temperature of 25° C.±5° C. and at a humidity of 50%±10%, and setting the amount of a droplet of distilled water at 1 to 4 μl, and wherein the measurement was made within a period of 1 min after leaving the droplet at rest on samples). As the gap-side surface has a larger water contact angle, in other words, as the gap-side surface has a higher water-repellent property, dew condensation is more likely to be caused on the gap-side surface, and the dew condensation can be easily held.

The thickness of a transparent sheet layer may be properly determined in consideration of the properties (such as transparency, mechanical strength and workability) of the transparent sheet used therein, the application of the building material and the like.

When a transparent sheet layer comprises a transparent plastic sheet, the transparent sheet layer has a thickness of preferably at most 800 μm, more preferably at most 700 μm, in consideration of transparency, workability and the like. In this case, the transparent sheet layer has a thickness of preferably at least 20 μm, more preferably at least 40 μm, in consideration of mechanical strength and the like.

In particular, when the transparent plastic sheet is in the form of a film, the transparent sheet layer has a thickness ranging preferably from 20 μm to 300 μm, more preferably from 40 μm to 200 μm.

In particular, when the transparent plastic sheet is in the form of a plate, the transparent sheet layer has a thickness ranging preferably from 200 μm to 800 μm, more preferably from 300 μm to 700 μm.

When a transparent sheet layer comprises a glass sheet, the transparent sheet layer has a thickness ranging preferably from 3 mm to 10 mm.

Each of the transparent sheet layers has a total light transmittance of preferably at least 70%, more preferably at least 85%, most preferably at least 90%. When each of the transparent sheet layers has a total light transmittance of at least 70%, it is easy to ensure an amount of light required for plant photosynthesis.

Even if the transparent sheet layer according to the present invention has an excessive amount of total light transmittance, there is no upper limit to the total light transmittance since a required amount of light and a required room temperature can be realized at a slight additional cost by utilizing vapor.

The total light transmittance of the transparent sheet layer according to the present invention may be measured in conformity with the regulation of JIS K7361-1.

There is no limitation to the number of the transparent sheet layers as long as the number is two or more. In consideration of the light transmittance, the cost, etc., the number of the transparent sheet layers is preferably from 2 to 5, more preferably from 2 to 3.

The plural transparent sheet layer may comprise plural transparent sheets, a single folded transparent sheet or a transparent sheet formed in a bag-like structure, for example.

The vapor supply system may comprise a vapor-generating unit, a blowing unit for transporting air containing generated vapor (humidified air), and a transport pipe for connecting the blowing unit to the gap between adjacent transparent sheet layers.

Examples of the vapor-generating unit include a combination of water bath and a heating device, such as a heater, and a humidifier generally used.

The blowing unit may comprise a general blower, for example.

The transport pipe is preferably made of a light-transmissive material, more preferably made of a transparent resin, as in the transparent sheet layer according to the present invention. By this arrangement, the transport pipe produces no shade in the interior of a building including the building material according to the present invention, and the amount of light coming into the building can be made more uniform.

Examples of the transparent resin forming the transport pipe include the same as the examples of the transparent resin contained the above-mentioned transparent plastic sheet. ETFE is particularly preferred because of being excellent in transparency, mechanical strength, heat-resistance, durability, etc.

Explanation of how to specifically use the vapor supply system will be made. When vapor is generated from the vapor-generating unit, air containing the generated vapor (humidified air) is moved through the transport pipe and is supplied into the gap by the blower.

The building material according to the present invention may have the same structure as the building material used in a known building, such as the building material used in, e.g., the roof of a house for cultivating plants, except for the provision of the vapor supply system. Examples of the structure of the building material according to the present invention are listed in items (1) and (2), for example:

(1) Structure wherein plural transparent sheet layers are formed in such a bag-like structure to have outer edge portions brought into close contact with each other, to have inner portions brought out of close contact with each other and to include an air supply port for supplying air into the bag-like structure (2) Structure wherein plural transparent sheet layers are disposed, interposing a spacer therebetween The structure of item (1) is of a type that supplies a gas, such as air, through the air supply port to put the gap between adjacent transparent sheet layers in a pressurized state in use, i.e., to expand the gap to stretch the adjacent transparent sheet layers tight.

Both of adjacent transparent sheet layers forming a gap may be stretched tight, or only one of the transparent sheet layers may be stretched tight.

In this type, each of the transparent sheet layers to be stretched tight is normally made of a transparent plastic sheet in the form of a film.

The structure of item (2) is of a type that is used without expanding the gap between adjacent layers.

Each of the transparent sheet layers in this type mainly comprises a transparent sheet in the form of a plate (such as a glass sheet, an acrylic resin sheet and a PC sheet).

Figure 5A:
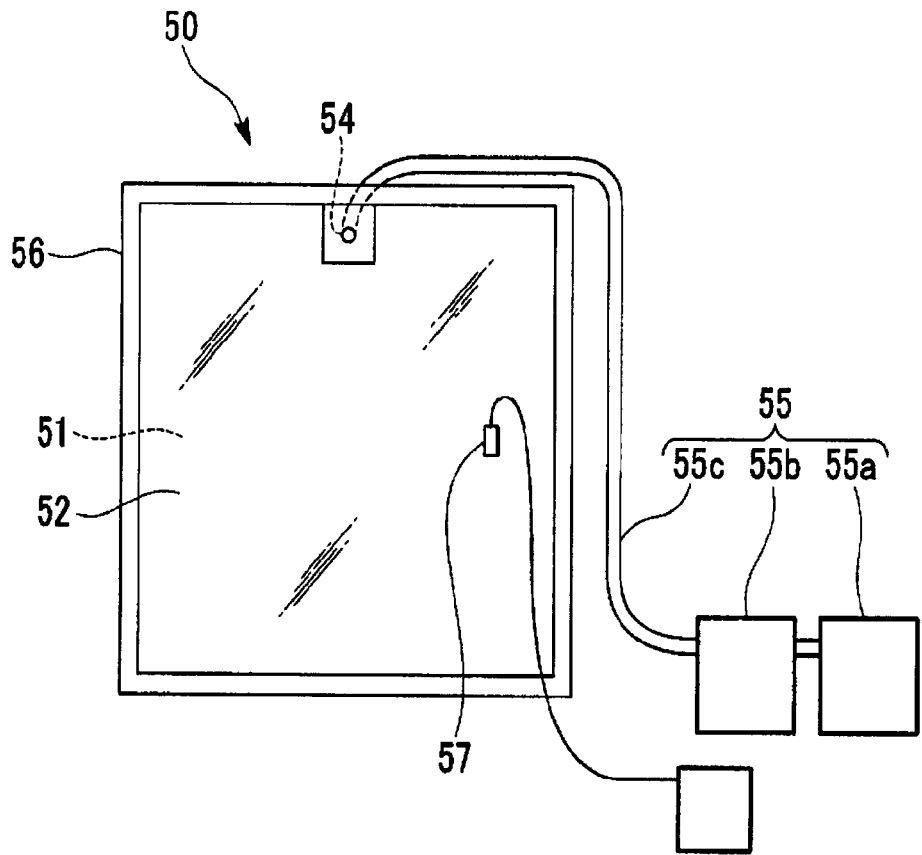
FIGS. 5($a$) and 5($b$) are a front view and a top plan view showing the building material according to an embodiment of the present invention.
Figure 5B:
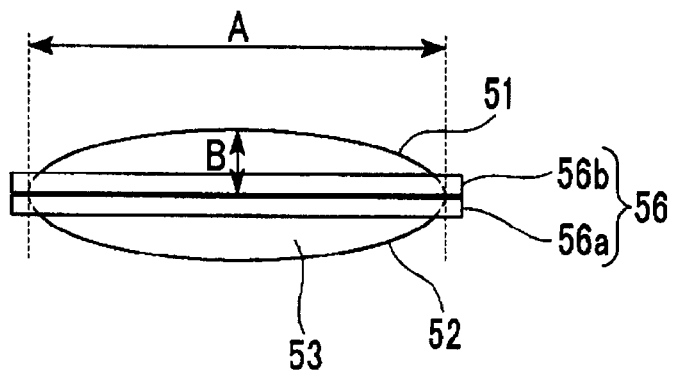

FIGS. 5(a) and 5(b) show the building material according to an embodiment of the present invention. The building material 50 according to this embodiment is of a type that is used, expanding the gap between adjacent transparent sheet layers as in the structure of item (1). FIG. 5(a) is a front view of the building material 50, and FIG. 5(b) is a top plan view of the building material 50 with the gap between adjacent transparent sheet layers being expanded.

The building material 50 according to this embodiment is configured so that two transparent sheet layers 51 and 52 are disposed through a gap 53 therebetween, that one of the transparent sheet layers 51 is formed with an air supply port 54, and that the air supply port 54 is connected to a vapor supply system 55 for supplying humidified air into the gap 53.

The vapor supply system 55 comprises a humidifier 55a for adding vapor to air to produce humidify air, a blowing unit 55b for moving the humidified air produced in the humidifier 55a, and a transport pipe 55c for communicating between the blowing unit 55b and the transparent sheet layer 51.

The transparent sheet layers 51 and 52 have outer edge portions supported by an outer frame 56.

The outer frame 56 comprises a receiver 56a and a retainer 56b. The receiver 56a and the retainer 56b have the outer edge portions of the transparent sheet layers 51 and 52 sandwiched therebetween.

The outer frame 56 has an edge portion formed with a clearance (not shown), through which the humidified air supplied into the gap 53 can be discharged outside, preventing the transparent sheet layers 51 and 52 from being excessively stretched.

The transparent sheet layer 52 has a surface close to the gap 53 formed with a sensor 57 for measuring the temperature and the humid in the gap 53.

In the embodiment shown in FIG. 5(b), it is shown that both of the transparent sheet layers 51 and 52 are equally stretched tight.

In a case where the gap is formed in a flat rectangular shape (a square shape or an oblong shape having dimensions of (short-side-length):(long-side-length)=from 1:1 to 1:20 as shown in FIG. 5(b), when both of the transparent sheet layers are stretched tight, the degree of stretching the transparent sheet layers tight is preferably set so that the ratio of length A to length B in FIG. 5(b) is within a range of (A:B=from 7:1 to 15:1), and is more preferably set so that the ratio of length A to length B in FIG. 5(b) is within a range of (A:B=from 10:1 to 12:1). When the ratio of A to B is at least 7, the convection of the air in the gap is equalized to improve thermal insulation. When the ratio of A to B is at most 15, it is easy to produce the building material since it is not necessary to strongly stretch the transparent sheets.

Length A represents the distance of a straight line, which connects two contact points where the transparent sheet layer 51 and the transparent sheet layer 51 are brought into contact with each other on a plane containing the section shown in FIG. 5(b).

Length B represents a width equal to one-half of the width of the gap (the distance between the transparent sheet layer 51 and the transparent sheet layer 52) at the most expanded portions.

The building material according to the present invention is not limited to the above-mentioned embodiment. Both of the transparent sheet layers forming the gap may be stretched tight, or only one of the transparent sheet layers may be stretched tight. Both of the transparent sheet layers may be different from each other in terms of the degree of tightness.

When the building material according to the present invention is actually utilized, the transparent sheet layers are not uniformly stretched tight in many cases, depending on the kind of the transparent sheet layers used in the building material, the kind of a building using the building material, a place using the building material or another factor. For example, when plural transparent sheet layers have different thicknesses, or when a roof is formed in an abnormal shape, the respective layers are not uniform in terms of tightness. For a specific example, the interior-side sheet surface and the exterior-side sheet surface of, e.g., a house for cultivating plants are different from each other in terms of tightness since the building material is normally disposed on a frame to bring the interior-side sheet surface into contact with the frame. There is a case where, as in the type item (2), the transparent sheets of plural layers are simply expanded in parallel without being stretched tight.

The building material according to the present invention is not limited to the above-mentioned building material 50.

Although the outer frame 56 for the building material is formed in a rectangular shape in the above-mentioned embodiment, the outer frame may be formed in a polygonal shape, such as a trapezoidal shape and a triangular shape, an arched shape, or any other desired shape. The shape of the outer frame may be properly determined according to a building using the building material.

Although each of the transparent sheet layers 51 and 52 of the outer frame 56 has all four sides fixed at the outer edge thereof, only one portion of the outer edge may be fixed, or it is acceptable to dispense with the outer frame. In other words, in the present invention, it is sufficient that when humidified air is supplied into the gap between the transparent sheet layers 51 and 52, a space for holding the humidified air can be formed in the gap. From this point of view, e.g., a transparent sheet layer, which is formed in a back-like structure, may be used in place of the transparent sheet layers 51 and 52, and the outer frame 56.

The position for connection with the transport pipe 55c is not limited to the transparent sheet layer 51 as long as the humidified air can be supplied into the gap adjacent transparent sheet layers. For example, a portion of the outer edge of the transparent sheet layer 51 or 52 may be opened, and an end portion of the transport pipe is disposed in the vicinity of the opening, or the transport pipe may be inserted directly into the gap through the opening.

A vapor-generating unit may be disposed on the gap between adjacent transparent sheet layers. An example of the vapor-generating unit disposed in the gap between adjacent transparent sheet layers is one where a heating element is fixed in a perforated tube with water contained therein. In this vapor-generating unit, the heating element is heated to produce vapor, which is discharged through the holes of the tube.

Although a single space (gap 53) exists in the gap between the transparent sheet layers 51 and 52 in the above-mentioned embodiment, the gap between both layers may be divided into two or more spaces. Examples of space division include a method for disposing a fixing member in the outer frame 56, and a method for heating portions of the transparent sheet layers 51 and 52 in an overlapping fashion to melt-bond the portions when each of the transparent sheet layers comprises a transparent plastic sheet made of a transparent thermoplastic resin.

When the gap is divided into two or more spaces, it is preferred that means for supplying humidified air be disposed in each of the divided spaces. Examples of such means include means to connect a vapor supply system to each of the spaces, and means to connect a vapor supply system to one of the spaces and to connect the one space to another space by a transport pipe or to connect the space in series. A specific example of the means to connect the vapor supply system to each of the spaces is means to connect the opening of each space to an air supply duct made of a transparent sheet, and to dispose an end portion of a transport pipe with a gas injection port in the air supply duct so as to spout humidified air from the gas injection port, shown in afore-mentioned FIG. 3.

Examples of the transport pipe for connection between divided spaces include the same as the examples of the transport pipe in the vapor supply system.

Although the building material is shown as having the structure of item (1) in the above-mentioned embodiment, the building material according to the present invention may have the structure of item (2).

Figure 6:
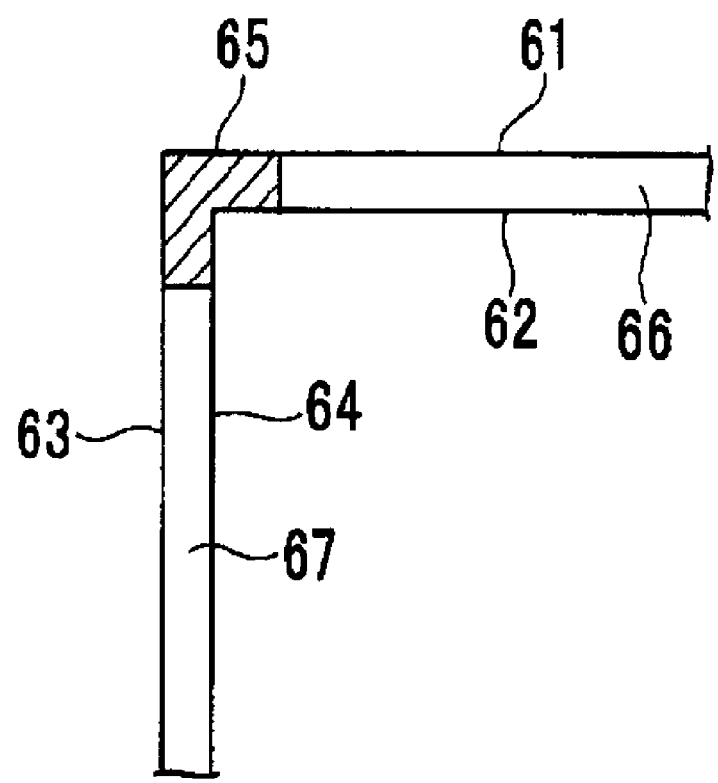
FIG. 6 is a cross-sectional view showing a portion of the building material according to another embodiment of the present invention.

FIG. 6 is an embodiment of the structure comprising transparent sheet layers and a gap in a building material having the structure of item (2).

In this embodiment, a spacer 65, which is formed in an L-character shape in section, has two transparent sheet layers 61 and 62 disposed at one end portion so as to confront with each other through the spacer 65, the transparent sheet layer 61 and the transparent sheet layer 62 forming a gap 66 therebetween. The spacer 65 also has two transparent sheet layers 63 and 64 disposed at the other end portion so as to confront with each other through the spacer 65, the transparent sheet layer 65 and the transparent sheet layer 64 forming a gap 67 therebetween.

In the building material having the structure of item (2), the width of respective gaps (the distance between the transparent sheet layer 61 and the transparent sheet layer 62, the distance between the transparent sheet layer 63 and the transparent sheet layer 64, etc.) is preferably from 1 to 50 cm, more preferably from 2 to 10 cm.

The building material according to the present invention is useful as a building roof, a building wall, a building window, etc.

The building material according to the present invention has a light-blocking effect as stated above, and further has a heat-insulating effect, an effect of scattering incoming light and softening transmitted light (the light in a building), a heating effect, etc., which will be explained in detail with respect to a method for controlling the indoor environment in a building stated later. From these points of view, the building material according to the present invention is appropriate to be used in a building where an indoor environment, such as light and temperature, needs to be controlled.

Examples of such a building where an indoor environment, such as light and temperature, needs to be controlled, include a building having the purpose of housing a living thing (for example, plants, such as vegetables, fruits and flowers; livestock, such as pigs, cattle, horses and chickens; an animal, such as a human being; fish, shrimps, lobsters, eels); and other applications such as a saltern, a warehouse, an exhibition hall, a cycling stadium, a motorboat race track, a racetrack, an automobile test course, a shelter and the roof of a water tank.

Specific examples of such a building having the purpose of housing a living thing include a house for cultivating plants (such as an agricultural greenhouse and a greenhouse for gardening), a barn, a facility for fish farming, and a sport facility (such as a gymnasium, a swimming pool, a tennis court, a soccer stadium, a baseball park, a gateball court), and a pick-your-own farm. Among them, the building material according to the present invention is most appropriate to be used in a house for cultivating plants, for which it is particularly important to control the indoor environment, such as light and temperature.

The building of the present invention is a building including the above-mentioned building material.

The building according to the present invention may be configured in the same way as a usual building except that the above-mentioned building material is utilized in a portion that needs to have a transparency (optical transparency) (such as a roof, a wall and a window).

Now, a specific example of a building including the building material according to the present invention will be explained, referring the accompanying drawings.

FIG. 1 is a perspective view showing the building according to an embodiment of the present invention, which utilizes the above-mentioned building material as its roof (hereinbelow, also referred to as the first embodiment). The building 10 constructed as shown in FIG. 1 has a building framework represented by a greenhouse having a gable roof.

The framework of a building, which is represented by a greenhouse having a gable roof, generally comprises a main body constructed by assembling members, such as poles, girders, binding beams, and a roof constructed by assembling members, such as a ridgepole, pole plates, rafters, purlins, and steep rafters. The respective members mainly comprise metal pipes or section bars. These members are assembled by metal joints, such as perpendicular clamps or universal clamps, and are constructed as the framework comprising the main body and the roof. A building, which is represented by a greenhouse having a gable roof, is generally constructed by mainly fixing transparent sheets to the framework.

The framework of the building 10 according to this embodiment is not different from that of a usual building and may have the same structure as that of a usual one.

The building 10 according to this embodiment has the roof 15, which is configured by fixing left and right openings of an envelope-like transparent plastic film 1 to two rafters 13 and 13 extending from a ridgepole 11 to a pole plate 12 as shown in FIG. 1. The transparent plastic film 1 is formed in a bag-like structure 2, which has a gap formed therein and has all outer edge portions sealed.

The bag-like structure 2 has an air supply port 3 formed in one of the surfaces thereof, and the air supply port 3 is connected to an end of a transport pipe 6a of a vapor supply system 6, which includes the transport pipe 6a and a humidifier 6b.

In the building 10, the bag-like structure 2 is divided into three sections by having intermediate portions fixed to two rafters 14 and 14.

The bag-like structure 2 thus divided has a communication pipe disposed between adjacent sections so that the air in the bag-like structure 2 can mutually communicate between adjacent sections. Although the communication pipe 5 may be disposed on an interior side or an exterior side, the communication pipe is preferably disposed on the interior side. It should be noted that when the intermediate portions of the bag-like structure 2 are not fixed to the rafters 14, the communication pipe 5 is not required to the bag-like structure 2 since the bag-like structure is not divided into sections.

In the roof 15, the bag-like structure 2 is normally kept expanded (stretched tight) by humidifying air supplied from the air supply port 3. The bag-like structure is configured so that an excessive amount of air in the bag-like structure is discharged through a discharge ports 4, 4 and 4 formed in the respective sections of the bag-like structure 2.

The above-mentioned structure has advantages of having good circulation and diffusion of humidified air in the bag-like structure 2 and having a high thermal efficiency since the inside of the bag-like structure 2 is divided into sections having a proper size or volume. The above-mentioned structure is also advantages in that when the bag-like structure, i.e., the roof of the building 10, is damaged and broken for some reasons, a portion to be repaired or mended is narrow.

In the building 10, the width of each section of the bag-like structure 2, i.e., the distance between adjacent rafters 14 and 14 or the distance between adjacent rafters 13 and 14 is preferably from 20 to 400 cm, more preferably from 30 to 250 cm.

The air supply port 3 has a diameter of preferably from 1 to 60 cm, more preferably from 4 to 30 cm.

Each of the air discharge ports 4 has a diameter of preferably from 0.4 to 80 cm, more preferably from 0.5 to 40 cm. It is possible to control snow melting and warm-keeping performance by modifying the diameters of the air discharges ports 4.

Each of the connection pipes 5 has a diameter of preferably from 1 to 60 cm.

Figure 2:
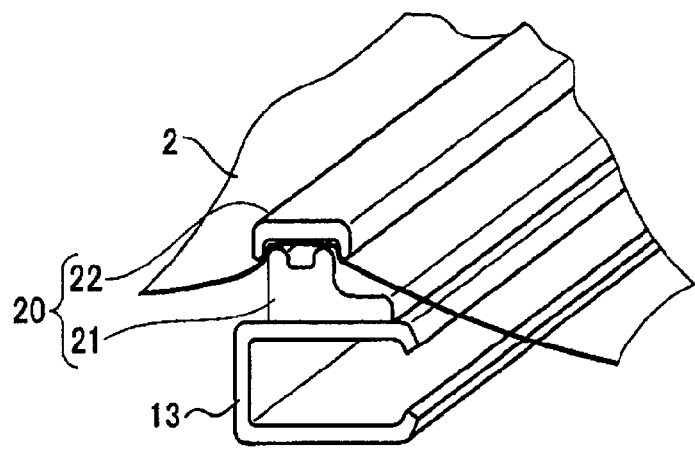
FIG. 2 is a perspective view showing an example of the film-clamping assembly used for fixing a transparent sheet.

A preferred example of a fixture (film-clamping assembly) for fixing the bag-like structure 2 to a rafter 13 is shown in FIG. 2.

The film-clamping assembly shown in FIG. 2 comprises an elongated bottom receiver 21 and an elongated retainer 22 to mate therewith.

When the bag-like structure 2 is fixed by using such a fixture, the bag-like structure is fixed to a rafter 13 by putting a lateral edge portion of the bag-like structure 2 on the bottom receiver 21 fixed to the rafter 13 and capping the edge portion with the retainer 22 to mate therewith An example of the film-clamping assembly 20 is a commercially available slide-lock type product "SURAIREIRU" (trademark: manufactured by Totokogyo company, LTD.). It should be noted that the fixing of the transparent plastic film 1 is not limited to such a preferred example.

Also, when the bag-like structure 2 is fixed to the rafters 14, the bag-like structure 2 may be fixed to the rafters 14 by the same method as the bag-like structure is fixed to the rafters 13.

The explanation of FIG. 1 has been made about a case where the roof 15 comprises a gable roof, the roof 15 is not limited to be formed in such a shape and may comprise, e.g., a semi-cylindrical arched roof. Even in the latter case, the roof is not essentially different from the case where the roof comprises a gable roof. Specifically, the rafters 13 and the rafters 14, which are linear in the case of the above-mentioned roof 15, are modified to be curved in an arched shape in the case of such an arched roof. For example, the bag-like structure may be fixed in a similar way by using a curved film-clamping assembly instead of the film-clamping assembly (the bottom receiver 21 and the retainer 22) shown in FIG. 2.

Figure 3:
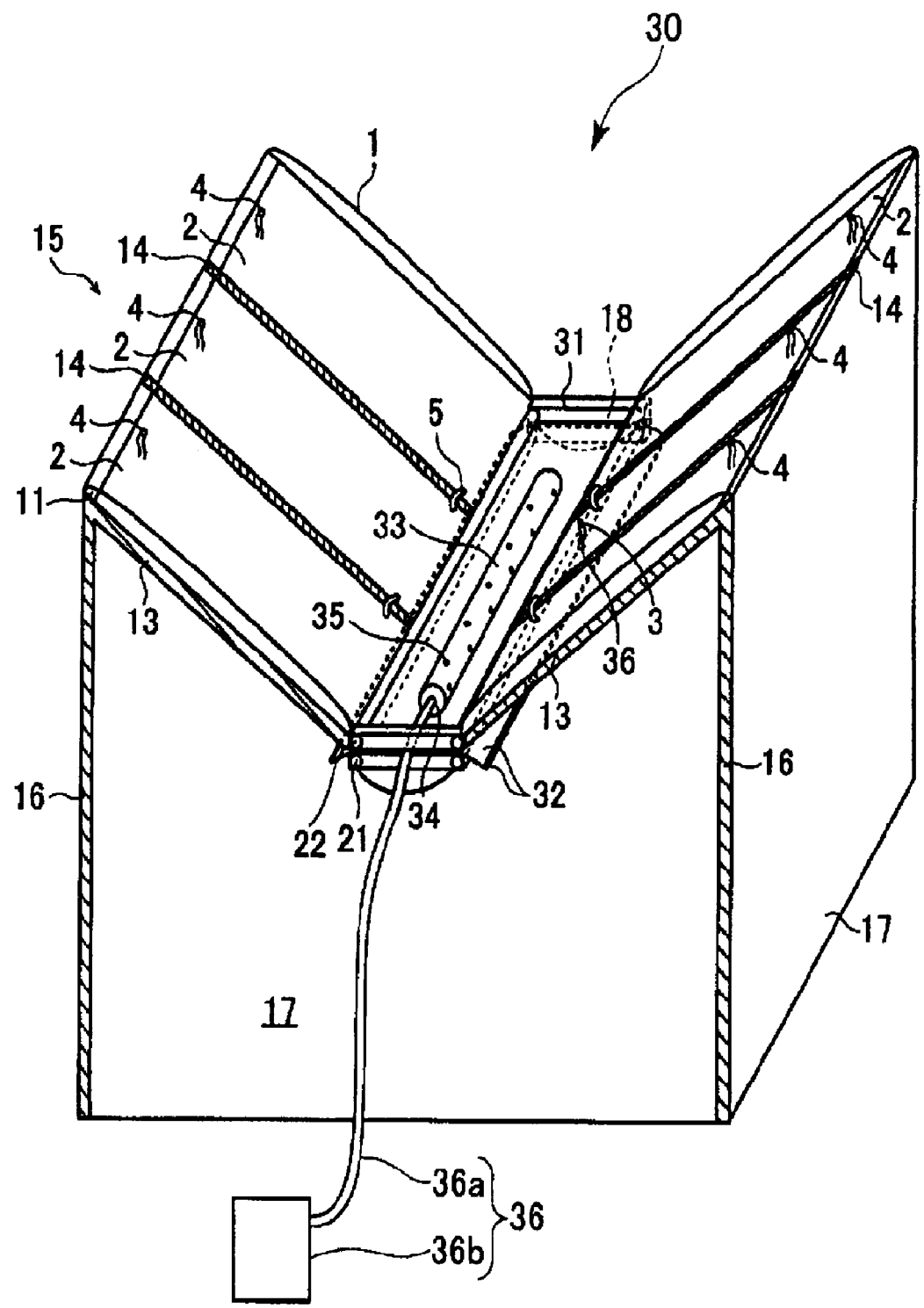
FIG. 3 is a perspective view showing the building according to another embodiment of the present invention, which includes the building material according to the present invention.

Now, the building having a gable roof according to another embodiment of the present invention will be described, referred to FIG. 3. It should be noted that with respect to the embodiment stated below, the elements corresponding to those in the first embodiment are represented by the same reference numerals, and detailed explanations of these elements are omitted.

The building 30 according to this embodiment is significantly different from the building 10 according to the first embodiment in that the roof of the building 30 comprises two roofs 15 and 15 disposed to confront each other and to be inclined in a substantially V-character shape, and that the roofs 15 and 15 have an air supply duct 31 disposed in a valley portion 18 therebetween so as to have the same length as the transverse width of the roofs (the depth of the valley portion 18).

The air supply duct 31 has its outer surface made of a transparent plastic film, and the air supply duct 31 has transparent plastic film wings 32 formed with outer edges thereof. Each of the wings 32 is overlapped with the bag-like structure 2 forming the roofs 15 and is fixed to rafters 13 by using a film-clamping assembly 20 (the bottom receiver 21 and the retainer 22) as shown in FIG. 2. The region where the bag-like structure 2 and each of the wings 32 are overlapped each other and jointed by the film-clamping assembly in an elongated shape has a small clearance (not shown) formed therein so that the air in the bag-like structure 2 can be discharged through the clearance.

The air supply duct 31 has a transparent plastic film tube 33 held therein, the transparent plastic film tube having an air supply port 34 and a plurality of air injection ports 35 formed therein, and the air supply port 34 is formed at an upstream end portion of the tube 33 (the end portion of the tube to which humidified air is supplied), being connected to an end portion of a transport pipe 36*a* of a vapor generating unit 36, which includes the transport pipe 36*a* and a humidifier 36*b*.

In the building 30, when humidified air is supplied, through the air supply port 34, into the tube 33 held in the air supply duct 31, the humidified air is injected through the plural air injection ports 35 formed in the tube 33. Thus, the transparent plastic film forming the air supply duct 31 is kept tight, and the humidified air is supplied into the bag-like structure 2. An excessive portion of the humidified air in the bag-like structure 2 is discharged through the above-mentioned clearance, which is formed in each of the regions jointed by the film-clamping assemblies 20 in an elongated shape.

The framework of the main body of the building 30 comprises poles 16 and other appropriately used members forming the main body, such as girders and beams, which are assembled by use of aluminum perpendicular clamps, universal clamps and joints. The building having the framework shown in FIG. 3 generally forms, e.g., a multi-ridge greenhouse.

The main body of the building 30 has transparent plastic sheets extending throughout the above-mentioned framework and fixed to the framework so as to form walls 17 by use of long film-clamping assemblies 20 as shown in FIG. 2. Each of the transparent sheets forming the walls 17 may be formed in the shape of a plate or the shape of a film.

The entrance (not shown) of the building 30 may be formed by extending a transparent plastic sheet (such as a transparent plastic film similar to the transparent plastic film 1), fixing the sheet to the framework by use of long film-clamping assemblies 20 as in the formation of the walls 17, and mounting a door (not shown) to that portion of the framework. It should be noted that the door is mounted to the main body in order to ensure airtightness in the building.

It is preferred in terms of warm-keeping that the outer walls of the building 30 (the walls 17) comprise transparent sheets extending in a dual structure, in particular, so as to be formed in a bag-like structure. Especially, it is most preferred in terms of control of the indoor environment and another factor to use the building material according to the present invention.

Although the air supply duct 31 is generally formed in a cylindrical shape or an angular cylindrical shape in section, the air supply duct is not limited to be formed in any one of these shapes. The air supply duct may be formed in a different shape. When the air supply duct 31 is formed in an angular cylindrical shape in section, it is preferred that the angular ridges be not as sharp as possible.

The dimensions of the air supply duct 31 in section may properly determined, depending on the dimensions of the roofs 15, the dimensions of the valley portion 18 and another factor. The air supply duct 31 has cross-sectional dimensions (vertical width×transverse width) ranging from 5 to 200 cm in vertical width and from 5 to 200 cm in transverse width, more preferably ranging from 25 to 150 cm in vertical width and from 25 to 150 cm in transverse width.

It is preferred that the air supply duct 31 have substantially the same length as the transverse width of the roofs 15 (the depth of the valley portion 18).

An example of the transparent plastic film forming the air supply duct 31 is a film made of a transparent resin as listed in connection with the transparent resin forming the transparent plastic sheet of the transparent sheet layer forming the building material according to the present invention.

Although the tube 33 is generally formed in a cylindrical shape or an angular cylindrical shape in section, the tube is not limited to be formed in any one of these shapes. The tube may be formed in a different shape. When the tube 33 is formed in an angular cylindrical shape in section, it is preferred that the angular ridges be not as sharp as possible.

There are no particular limitations to the dimensions of the tube 33 in section as long as the tube is movable in the air supply duct 31. The tube 33 has cross-sectional dimensions (vertical width×transverse width) ranging from 2 to 190 cm in vertical width and from 2 to 190 cm in transverse width, more preferably ranging from 5 to 50 cm in vertical width and from 5 to 50 cm in transverse width.

The tube 33 has a length of about from 70 to 100% of the length of the air supply duct 31.

It is preferred that the transparent plastic film forming the tube 33 be the same material as the transparent plastic film forming the air supply duct 31. The transparent plastic film forming the tube 33 preferably comprises a transparent plastic film which is slightly thinner or slightly softer than the transparent plastic film forming the air supply duct 31, from the viewpoint that the air supply duct 31 becomes more difficult to be damaged by movement of the tube 33 in the air supply duct 31.

The air supply port 34 of the tube 33 is configured so as to be capable of being connected to the transport pipe 36a of the vapor-supply unit 36.

The air supply port 34 has a diameter of preferably from 1 to 60 cm, more preferably from 4 to 30 cm.

The plural air injection ports 35 are formed at suitable intervals between the upstream end and a downstream end on a peripheral surface of the tube 33.

The number of the air injection ports 35 is preferably from 1 to 10 ports/m² (the area of the roofs), more preferably from 1 to 5 ports/m². Each of the air injection ports 35 has a diameter of preferably from 1 to 50 mm, more preferably from 5 to 30 mm.

Figure 4:
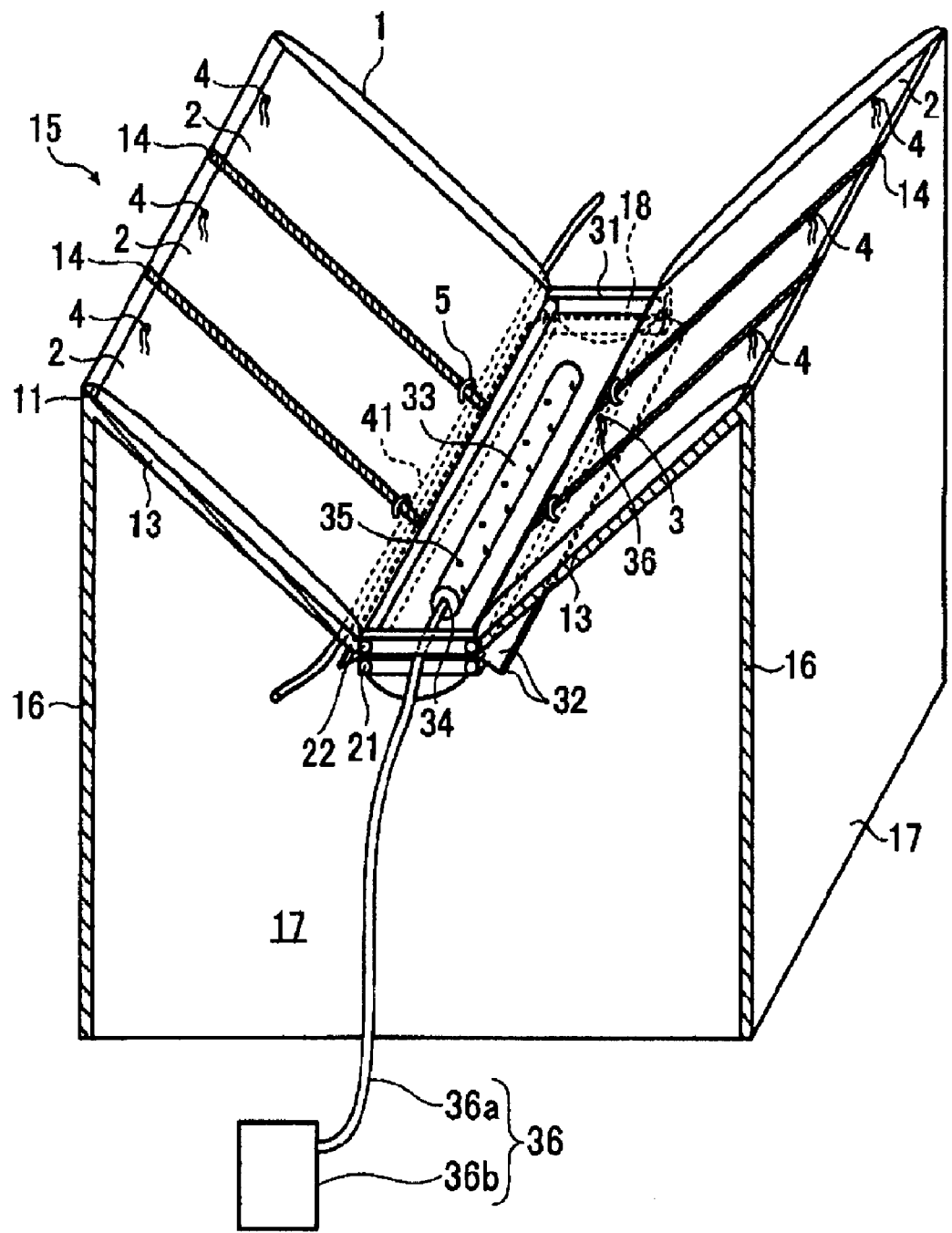
FIG. 4 is a perspective view showing a preferred example of the building according to the embodiment shown in FIG. 3.

In the building 30 according to this embodiment, it is preferred that a liquid passing pipe 41 be disposed so as to extend in the same direction of film-clamping assemblies 21 and 22 in the vicinity of a lower part of the valley portion 18 of the roofs 15, i.e., in the vicinity of the film-clamping assembly 20 as shown in FIG. 4 so that the liquid passing pipe 41 is configured to allow warm water or a warm antifreezing fluid to come thereinto from outside the building and to pass therethrough. By passing such warm water or such a warm antifreezing fluid through the liquid passing pipe 41, the heat radiation from the liquid passing pipe 41 exerts synergistic effects, such as an increase in the temperature in the bag-like structure 2 to heat the air in the building.

The liquid passing pipe 41 may be disposed only on the side of one of the two roofs 15 and 15 or may be disposed on the side of each of the two roofs. It is preferred that the liquid passing pipe be disposed on the side of each of the two roofs.

The liquid passing pipe 41 may comprise a straight pipe or a bent pipe.

With respect to the length of the liquid passing pipe 41, the longer, the better in terms of an improvement in the above-mentioned effects.

The liquid passing pipe 41 has a diameter of preferably from 3 to 20 cm, more preferably from 3 to 8 cm.

The liquid passing pipe 41 has a wall thickness of preferably from 0.05 to 5 mm, more preferably from 0.1 to 0.2 mm.

It is preferred that the liquid passing pipe 41 comprise a resin pipe or a metal pipe. Although the liquid passing pipe is more preferably made of a transparent plastic film, the liquid passing pipe is not limited to be of such a transparent plastic film.

The warm water or the warm antifreezing fluid has a temperature of from 30 to 95° C., preferably from 60 to 90° C., more preferably from 75 to 85° C. The flow rate of the warm water or the warm antifreezing fluid may be properly determined so as to be capable of obtaining a desired heating effect, etc.

Method for Controlling the Indoor Environment in a Building

The method for controlling the indoor environment in a building according to the present invention is a method for controlling the indoor environment in a building including the above-mentioned building material.

The method for controlling the indoor environment in a building according to the present invention needs to comprise at least a step for supplying humidified air into the gap between adjacent transparent sheet layers to cause dew condensation on a gap-like surface of such adjacent transparent sheet layers.

The phrase "humidified air" means air that contains vapor in such an amount that when the humidified air is is filled in the gap, the vapor pressure in the gap is higher than the saturated vapor pressure at the lowest temperature (the minimum temperature) in the environment where the building material is disposed, as stated above.

The humidified air may have the same composition as the atmosphere except for the amount of vapor or may have a different composition from the atmosphere. An example of the case where the humidified air has a different composition from the atmosphere is a case where a specific gas that exists or does not exist in the normal atmosphere is added to the atmosphere.

In the present invention, it is preferred that the humidified air contain a gas having a heat-ray absorption capacity. In such a case, the above-mentioned thermal insulation is further improved.

Examples of the gas having a heat-ray absorption capacity include a carbon dioxide ($CO_2$) gas, a methane ($CH_4$) gas, a nitrous oxide ($N_2O$) gas, a hydrofluorocarbon gas, a perfluorocarbon gas and a sulfur hexafluoride ($SF_6$) gas. When the building is a house for cultivating plants, a carbon dioxide gas among them is particularly effective because of having a growth promoting effect for plants.

The carbon dioxide gas in the humidified air has a concentration of preferably at least 1,000 ppm in terms of being suitable for plant growth and preferably at most 10,000 ppm in terms of having no adverse effect on persons.

There is no limitation to the temperature of the humidified air as long as the humidified air has a relative humidify of at most 100%, containing the above-mentioned amount of vapor. Consideration of the probability of causing dew condensation, a required light-blocking efficiency, etc., the humidified air has a temperature preferably ranging from an outdoor temperature of the building plus 10° C. to the outdoor temperature of the building plus 70° C. Taking the heat-resistance of the film and the cost required for vapor generation into account, the humidified air has a temperature preferably ranging from +20 to +30° C. By controlling the temperature of the humidified air, it is possible to control the time period required for dew condensation. For example, the temperature of the humidified air increases, the time period required for dew condensation decreases. As the temperature of the humidified air increases, the amount of dew condensation on a transparent sheet layer and the particle sizes of dew condensation increase, enhancing the light-blocking effect.

It is preferred that the humidified air has a higher relative humidity than the air that has already existed in the gap between adjacent transparent sheet layers. It is particularly preferred that the humidified air have a relative humidity of at least 90%. When the relative humidity is at least 90%, dew condensation is likely to be caused, and the time period required dew condensation decreases. As the humidified air has a higher relative humidity, the amount of dew condensation on a transparent sheet layer and the particle sizes of dew condensation increase, enhancing the light-blocking effect.

The supply rate (flow rate) of the humidified air may be properly determined in consideration of the volume in the gap, the time period required for exhibiting the light-blocking effect, etc. For example, when the volume in the gap ranges from 0.05 to 0.15 $m^3$, the flow rate of the humidified air is preferably at least 0.2 $m^3$/min and more preferably at least 0.4 $m^3$/min. When the flow rate is at least 0.4 $m^3$/min, it is possible to decrease the time period required for maximizing the light-blocking rate. The flow rate has an upper limit of preferably at most 1 $m^3$/min and more preferably at most 0.6 $m^3$/min. Even the flow rate of at most 1 $m^3$/min is enough to restrain the light-blocking rate from being decreased by excessive dew condensation on a film surface.

In the present invention, the light-blocking effect is exhibited by filling vapor in the gap to cause dew condensation on a transparent sheet layer.

Specifically, when the humidified air is supplied into the gap, the transparent sheet layer that has contact with an environment having the above-mentioned minimum temperature (such as the outside of the building), among the transparent sheet layers, has dew condensation caused on a gap-side surface thereof. In other words, a portion of the air in the vicinity of the surface of said transparent sheet layer in the gap is cooled to a temperature in the vicinity of the minimum temperature, lowering the saturated vapor pressure in the vicinity of said surface to a lower level than the vapor pressure in the gap. As a result, the relative humidity in the vicinity of the surface of said transparent sheet layer is beyond 100%, and an excessive amount of vapor adheres (is condensed) on the surface of said transparent sheet layer.

The vapor and the dew condensation in the gap not only reflect and scatter light incident from one side (incident side) of the building material but also reduce the amount of light transmitting toward the opposite side of the incident side of the building material, exhibiting a light-blocking effect.

Since a state without dew condensation hardly exhibits a light-blocking effect even if vapor exists in the gap, dew condensation is particularly important in order to exhibit a light-blocking effect. It is supposed that the vapor in the gap is helpful to assist an improvement in the light-blocking effect by increasing the degree of scattering the light or another factor.

In accordance with the present invention, the vapor and the dew condensation scatter incident light to make transmitted light (the light in the building) mild, having a higher ratio of scattered light than direct light. Light containing a high ratio of scattered light is more preferred for e.g., animals and plants in the building than, e.g., direct light in the summer. Such light containing a high ratio of scattered light is advantageous to a crop, an improvement in the working environment in the building, etc.

From this point of view, the present invention is quite useful when the building comprises a house for cultivating plants.

In accordance with the present invention, it is also possible to have an excellent heat-insulating effect by supplying humidified air in the gap to contain a large amount of vapor in the gap. In other words, vapor has an excellent heat absorption capacity or a higher heat-ray absorption capacity than, e.g., a carbon dioxide gas generally known as a greenhouse gas. For example, vapor has an infrared absorption capacity of at least 40 times the infrared absorption capacity of a carbon dioxide gas. In this way, the vapor in the gap absorbs heat-rays outside the building (such as near-infrared rays of the sunlight) and heat-rays in the building, restraining heat from being transferred from outside the building to the inside of the building and from indoor to outdoor. Accordingly, the room in the building can be kept at a comfortable temperature so that temperature in the building is restrained from being increased in the summer, and heat is prevented from being diffused from indoor to outside in the winter, for example.

Accordingly, in the present invention, it is also possible to control the warm-keeping performance of the building by controlling the amount of vapor existing in the gap to adjust the heat-insulating effect of the building material. For example, the amount of vapor increases, the heat-insulating effect of the building material can be improved to improve the warm-keeping performance of the building material.

The amount of vapor existing in the gap may be controlled by adjusting the relative humid, the supply amount of the humidified air, etc.

It is also possible to restrain the temperature in the building from being increased by such measures that vapor in the gap, which has absorbed heat-rays, is recovered, and that a humidified air containing vapor having a lower temperature is supplied.

By supplying, as the humidified air, humidified air having a high temperature, it is also possible to have a heating effect of increasing the temperature in the building, with the result that it is possible to restrain the radioactive cooling at night in, e.g., a house for cultivating plants.

In the present invention, it is possible to control the amount of dew condensation on a gap-side surface of the transparent sheet layers by adjusting the number of the surfaces subjected to hydrophilic treatment among all the gap-side surfaces of the transparent sheet layers. It is possible to control the light-blocking effect by controlling the amount of dew condensation in this way.

In other words, when the gap-side surface of a transparent sheet layer is not subjected to hydrophilic treatment as stated above, said surface is likely to have dew condensation caused thereon. As the number of the surfaces subjected to no hydrophilic treatment among all the gap-side surfaces increase, the number of the surfaces that are likely to have dew condensation caused thereon increases, with the result that the total amount of dew condensation increases. As the amount of dew condensation increases, the light-blocking effect by dew condensation is enhanced to have a higher light-blocking rate. By having the surfaces subjected to no hydrophilic treatment, it is possible to extend the time period to maintain dew condensation on the gap-side surfaces and to extend the time period to be capable of maintaining the light-blocking effect.

The number of the surfaces subjected to no hydrophilic treatment among the gap-side surfaces may be set at a value ranging from 0 to (the number of the gap-side surfaces) according to a desired light-blocking rate.

In the present invention, it is preferred to include a step for adjusting the inclination angle of the building material with respect to light incident from outside the building to control the incident angle of the incident light on the surface of the building material. By controlling the incident angle, the building material is allowed to change the light-blocking rate to finely control the brightness in the building.

For example, as the incident angle of the incident light on the surface of the building material is brought closer to 0° (in other words, a state where light enters from a direction perpendicular to the building material), the light-blocking rate decreases. On the contrary, as the incident angle of the incident light on the surface of the building material increases, the light-blocking rate increases. For example, by changing the incident angle from 0° to 45°, it is possible to increase the light-blocking rate by two times or above. Specifically, when the light-blocking rate is 20% in the case of an incident angle of 0° for example, the light-blocking rate can be changed to 50% or the like by setting the incident angle at 45°.

The step for controlling the incident angle may be performed before the dew condensation step or at the same time as the dew condensation step.

Specifically, the installation angle (inclination angle) of the building material for a roof, etc. may be adjusted in advance so as to set the incident angle at a desired value when installing the building material at the building for example.

The installation angle may be properly adjusted so as to set the incident angle at a desired value after having installed the building material at a building. It is possible to restrain the light amount in the building from being varied all year long by setting the inclination angle at different values in the summer and the winter for example.

While the dew condensation step is performed, the installation angle of the building material may be adjusted.

The inclination angle of the building material may be properly determined according to applications. For example, the building material is used as a roof, it is preferred from the viewpoint of having an excellent light-blocking effect that the inclination angle be set at a value ranging from 10 to 50° with respect to the horizontal surface.

EXAMPLES

Now, the present invention will be described in detail, referring to examples. It should be noted that the present invention is not limited to the examples.

The total light transmittance of the ETFE films used in the examples and the comparative examples stated below were measured according to JIS (Japanese Industrial Standard) K7361-1.

Example 1

In this example, experiment was carried out in a room having temperature of 25° C. and a relative humidity (hereinbelow, abbreviated as RH) of 33%.

First, a building material was prepared so as to have the same structure as the building material 50 shown in FIG. 5 by the following process.

Figure 7A:
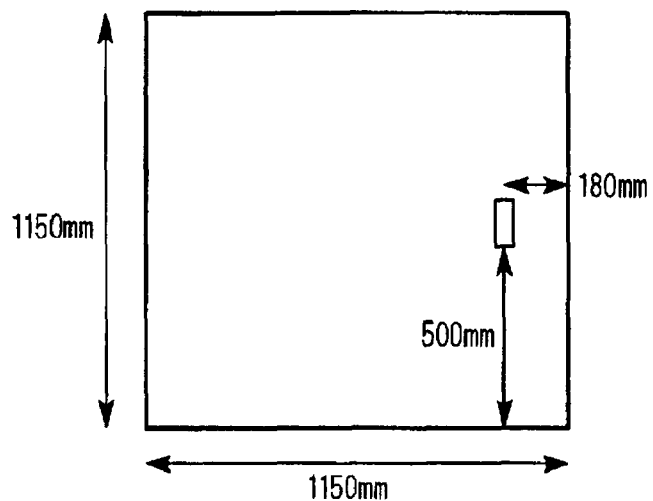
FIGS. 7($a$) and 7($b$) are a schematic view explaining the building material in Example 1 and a view showing the positional relationship among the building material, the light source lamp and the light meter in each of Examples 1 to 5.
Figure 7B:
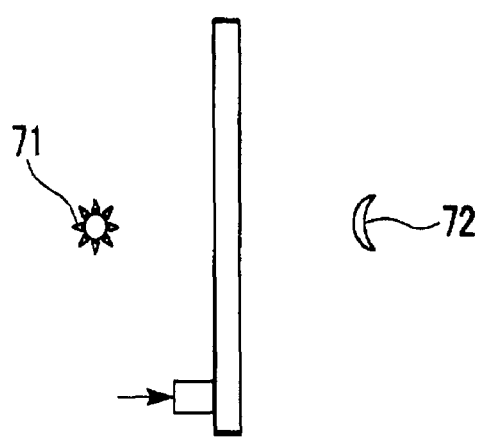

Two ETFE films, which had not been subjected to hydrophilic treatment (having a thickness of 100 μm, sold in the name of "F-CLEAN without non-dew flow type" manufactured by Asahi Glass Company, Limited, having dimensions of 1,250 mm in length and 1,250 mm in width, and having a total light transmittance of from 93 to 94%), were prepared. One of the ETFE films included an air supply port, and the other ETFE film included a humidity/temperature meter ("TR-72S" manufactured by D&D CORPORATION) in order to measure the temperature and the RH in the gap. The humidity/temperature meter was put so that the sensor was located at a position apart from the right edge by 180 mm and from the lower edge by 500 mm as shown in FIG. 7(*a*).

These ETFE films were combined as a panel having a dual membrane structure by putting one of the films over the other so as to house the humidity/temperature meter between the films and sandwiching the films between a receiver and a retainer forming an outer frame having a square shape (having inner dimensions of 1,150 mm in length and 1,150 mm in width).

A hole (which had a diameter of 25 mm and the same shape as the air supply port for humidified air) was formed at a single location in the vicinity of the outer frame in order to discharge the air in the gap.

The air supply port formed in the panel was connected to one end of a tube (which comprised a cylindrical tube made of a polyvinyl chloride resin and having an inner diameter of 25 mm), and the other end of the tube was connected to an electric blower (TYPE 1 (50/60 Hz, 55/51 W) manufactured by YODOGAWA ELECTRIC TOOL MFG. CO.).

A humidity/temperature meter, which was similar to the one put in the membranes, was put in a connecting portion with the air supply port in the tube in order to measure the temperature and the humid of the supplied air.

A water bath, which was put on an induction-heating cooker ("MH-B1" (100 V and 1350 W) manufactured by Hitachi, Ltd.), was put into a casing made of a transparent resin, and the casing was connected to the blower, forming a building material (hereinbelow, referred to as the building material (1)).

Next, a light source lamp 71 ("National High-lamp 300 W type" manufactured by Matsushita Electric Industrial Co., Ltd.) was put on the side of one of the ETFE film surfaces of the building material (1) thus formed (the ETFE film surface with the air supply port formed therein) as shown in FIG. 7(*b*). A light meter 72 ("ANA-F11 General A class light meter" manufactured by The Optronics Co., Ltd.) was put on the side of the opposite ETFE film surface.

In this example, the light source lamp 71 and the light meter 72 were put so that a straight line connecting between the light emitting portion of the light source lamp 71 and the sensor of the light meter 72 passes through the center in the outer frame in a direction perpendicular to a plane containing the outer frame of the building material (1).

The distance between the light emitting portion of the light source lamp 71 and the center in the outer frame (hereinbelow, referred to as the lamp distance) was set at 450 mm. The distance between the sensor of the light meter 72 and the center in the outer frame (hereinbelow, referred to as the light-meter distance) was set at 320 mm.

Next, the blower was used to supply normal air (atmosphere) (having a flow rate of 0.4 m$^3$/min) in the gap between the ETFE films (in the membranes) to stretch the ETFE films tight as shown in FIG. 5(*b*). At that time, the length of the gap at the most expanded portion was 100 mm, and the length at a point B in FIG. 5(*b*) was 50 mm. This means A:B=23:1.

Next, the supply of humidified air (air containing vapor generated from the water path by the induction-heating cooker) was started at the same flow rate (0.4 m$^3$/min) after the temperature in the membranes reached a temperature in the range of room temperature (25° C.)±1° C. The humidified air supplied at that time had a temperature of 51° C. and a RH of 93% in the vicinity of the air supply port.

The humidified air, which was supplied into the membranes through the air supply port, convectively circulated about the entire gap. The air in the gap was discharged through the clearances formed at the four corners of the outer frame. As time went by, dew condensation was gradually caused on the inner surfaces of the ETFE films.

During supply of the humidified air, the A:B ratio was constantly kept at 23:1.

Figure 10:
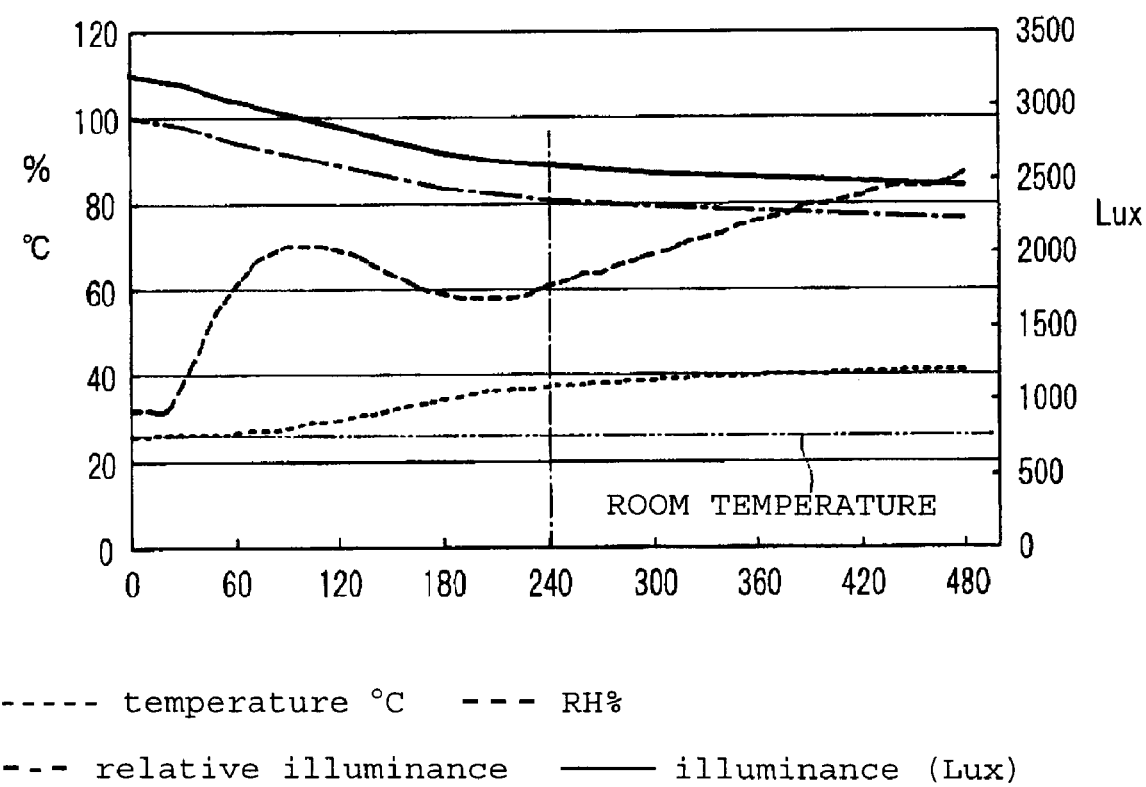
FIG. 10 is a graph showing results in Example 1.

Changes in the temperature and the RH in the membranes, and changes in the illuminance measured by the light meter 72 were observed since the start of humidity air supply. Based on the observation, a graph was prepared, representing times (sec) as the horizontal axis and temperatures (° C.), RHs (%) and illuminance (Lux) as the vertical axis. Additionally, the ratio (%) of the measured illuminance to the illuminance at the start of supply was found, and the found value was shown as a relative illuminance (%) in the graph. The graph is shown in FIG. 10.

The relative illuminance started decreasing just after the start of humidified air supply. In 240 sec, the relative illuminance decreased by about 20% in comparison with the relative illuminance at the start of supply. After that, the relative illuminance was almost kept constant. This reveals that the light-blocking rate under the above-mentioned conditions was about 20%.

The RH in the membranes abruptly increased within a period of about 30 sec, and then the RH decreased once. After that, the RH started slowly increasing again in about 180 sec since the start of supply.

After 480 sec passed since the start of humidified air supply, the illuminance was measured with the panel being inclined at an angle of 45 deg without shifting the center of the outer frame. The illuminance decreased to about 42% of the illuminance found just after the start of humidified air supply. This reveals that when the panel was inclined at an angle of 45 deg, the light-blocking rate increased by two times and more in comparison with a case where the panel was not inclined.

Before humidified air was supplied, i.e., before dew condensation was caused, the illuminance was measured with the panel being inclined at an angle of 45 deg. It reveals that the illuminance was 96% of the illuminance in a case where the panel was not inclined at an angle of 45 deg, and that the illuminance decreased by about 4% in comparison with the case where the panel was not inclined at an angle of 45 deg.

Example 2

Figure 11:
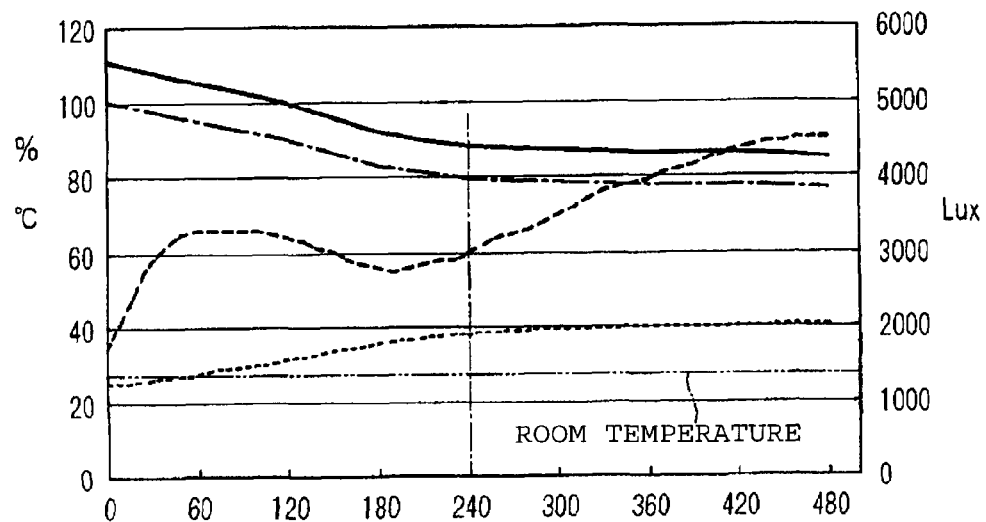
FIG. 11 is a graph showing results in Example 2.

The conditions were set as the same as Example 1 except that lamp distance was set at 250 mm. A graph was prepared to show changes in the temperature and the RH in the membranes, and changes in the illuminance and the relative illuminance measured by the light meter 72 since the start of humidified air supply. The graph is shown in FIG. 11.

It is revealed that although the illuminance increased in comparison with Example 1 because the lamp distance were set at 250 mm, the relative illuminance and the RH and the temperature in the membranes showed almost similar changes to the ones in Example 1.

Example 3

Figure 12:
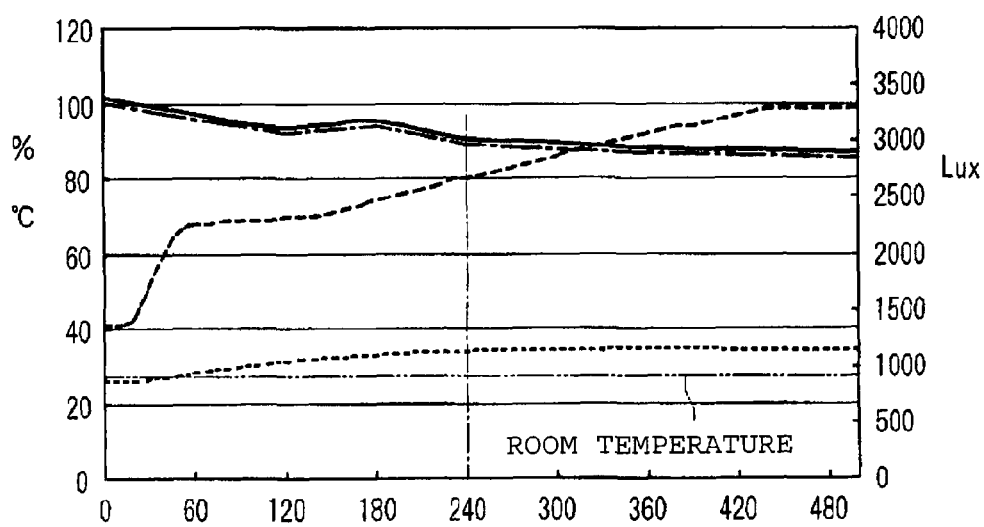
FIG. 12 is a graph showing results in Example 3.

Measurement was made in the same way as that in Example 1 except that the humidified air had a temperature of 36° C. and a RH of 63% in the vicinity of the air supply port. A graph was prepared to show changes in the temperature and the RH in the membranes, and changes in the illuminance and the relative illuminance measured by the light meter 72 since the start of humidified air supply. The graph is shown in FIG. 12.

The relative illuminance started decreasing just after the start of humidified air supply. In 240 sec, the relative illuminance by about 10% since the start of supply. After that, the relative illuminance was kept almost constant.

After the RH in the membranes abruptly increased within a period of about 30 sec, the RH slightly decreased. After that, the RH slowly increased.

Although the time when dew condensation was first caused on the gap-side surfaces of the ETFE films was almost equal to those in Examples 1 and 2, the amount of dew condensation was low, and the sizes of dew condensation were small.

Example 4

Figure 13:
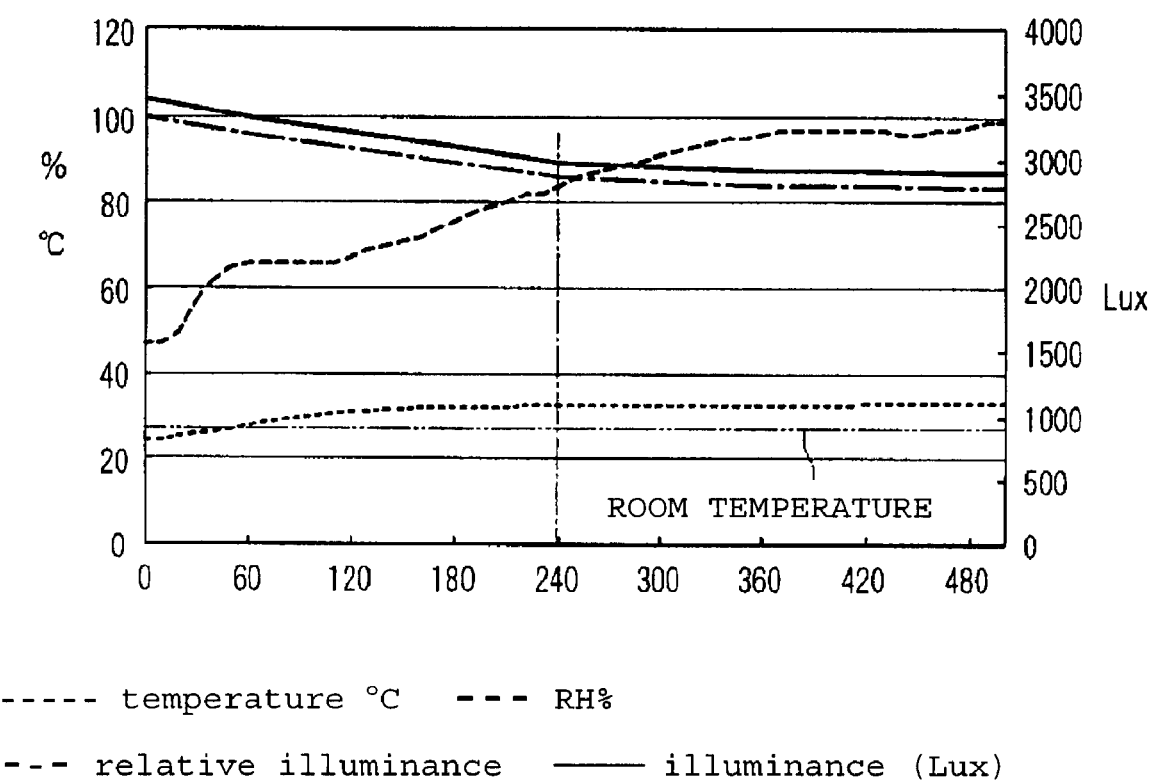
FIG. 13 is a graph showing results in Example 4.

Measurement was made in the same way as that in Example 1 except that the humidified air had a temperature of 45° C. and a RH of 63% in the vicinity of the air supply port. A graph was prepared to show changes in the temperature and the RH in the membranes, and changes in the illuminance and the relative illuminance measured by the light meter 72 since the start of humidified air supply. The graph is shown in FIG. 13.

The relative illuminance started decreasing just after the start of humidified air supply. In 240 sec, the relative illuminance decreased by about 15% in comparison with the relative illuminance at the start of supply. After that, the relative illuminance was kept almost constant.

After the RH in the membranes abruptly increased within a period of about 30 sec, the RH slightly decreased. After that, the RH slowly increased.

Although the time when dew condensation was first caused on the gap-side surfaces of the ETFE films was equal to that in Example 3, the amount of dew condensation was higher than that in Example 3, and the particle sizes of dew condensation were larger than the ones in Example 3.

Comparative Example 1

Measurement was made in the same way as that in Example 1 except that air, which had a temperature 25° C. and a RH of 70% (air humidified by a humidifier ("FE-KLA05" manufactured by Matsushita Electric Industrial Co., Ltd.) was used, instead of humidified air. The changes in the membrane were observed since the start of air supply. No dew condensation was caused on the gap-side surfaces of the ETFE films. No change in the illuminance was found.

Example 5

A panel having a dual membrane structure was made in the same way as that in Example 1 except that the ETFE film that had the air supply port formed therein, i.e., the ETFE film closer to the light source lamp 71 comprised an ETFE film having both surfaces subjected to hydrophilic treatment (having a thickness of 100 μm, sold in the name of "F-CLEAN (dew flow type)" manufactured by Asahi Glass Company, Limited, having dimensions of 1,250 mm in length and 1,250 mm in width and having a total light transmission rate of from 93 to 94%). Measurement was made in the same way as that in Example 1 except that the above-mentioned panel was used to form the building material (2).

Figure 14:
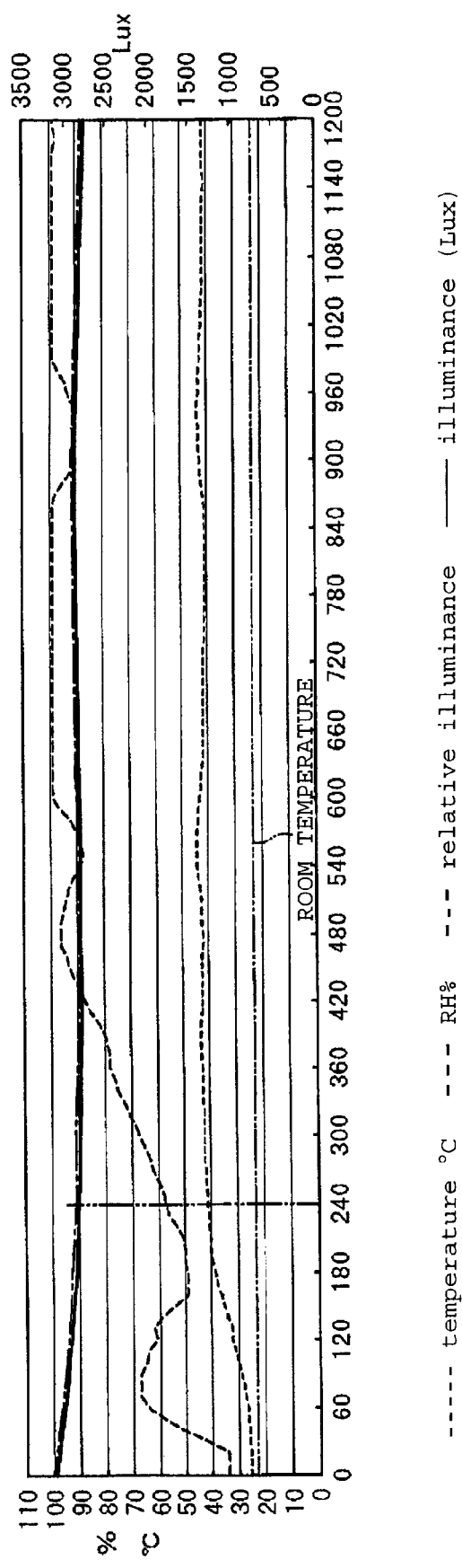
FIG. 14 is a graph showing results in Example 5.

Measurement was made in the same way as that in Example 2 except that the building material (2) was used, the measurement was made in a room having a temperature of 23° C. and a RH of 50%, and that the measurement time was extended from 480 sec to 1,200 sec. A graph was prepared to show changes in the temperature and the RH in the membranes, and changes in the illuminance and the relative illuminance measured by the light meter 72 since the start of humidified air supply. The graph is shown in FIG. 14.

The relative illuminance started decreasing just after the start of humidified air supply. In 240 sec, the relative illuminance decreased by about 10% in comparison with the relative illuminance at the start of supply. After that, the relative illuminance was kept almost constant.

The RH and the temperature in the membranes showed almost similar changes to those in Example 1.

While the humidified air was supplied, flows of droplets (flows of dew condensation) were generated on the gap-side surface of the ETFE film subjected to hydrophilic treatment in about 240 sec after the start of supply. In 360 sec, flows of dew condensation were generated on the entire gap-side surface.

On the other hand, the gap-side surface of the ETFE film subjected to no hydrophilic treatment, the growth in dew condensation was slow, and no flows of dew condensation were found even after 1,200 sec passed.

Example 6

Figure 8:
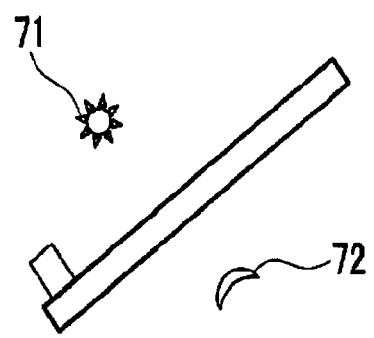
FIG. 8 is a view showing the positional relationship between the building material, the light source lamp and the light meter in Example 6.
Figure 15:
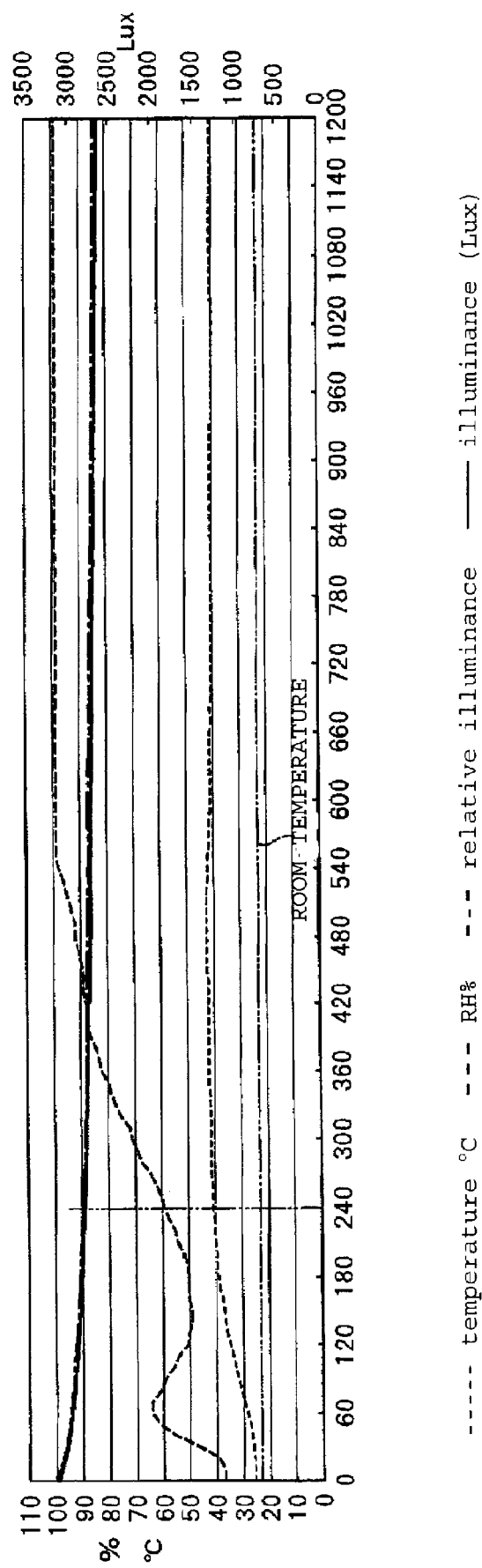
FIG. 15 is a graph showing results in Example 6.

Measurement was made in the same way as that in Example 5 except that a panel comprising the building material (2) made in Example 5 was inclined at an angle of 45° with respect to an installation surface (horizontal surface) as shown in FIG. 8, and that the light source lamp 71 and the light meter 72 were located so that a straight line connecting between the light emitting portion of the light source lamp 71 and the sensor of the light meter 72 passed through the center in the outer frame in a direction perpendicular to a plane containing the outer frame of the building material (2) (the combination of the building material (2), the light source lamp 71 and the light meter 72 in Example 5 is entirely inclined at an angle 45° without modifying the relative positional relationship thereamong). A graph was prepared to show changes in the temperature and the RH in the membranes, and changes in the illuminance and the relative illuminance measured by the light meter 72 since the start of humidified air supply. The graph is shown in FIG. 15.

The measurement revealed that the illuminance, the relative illuminance, and the RH and the temperature in the membranes showed almost similar changes to those in Example 5, and that the flows of dew condensation had the same tendency.

Example 7

Figure 9:
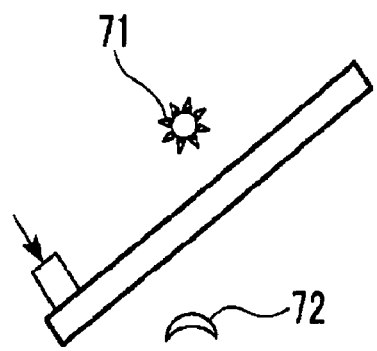
FIG. 9 is a view showing the positional relationship among the building material, the light source lamp and the light meter in Example 7.
Figure 16:
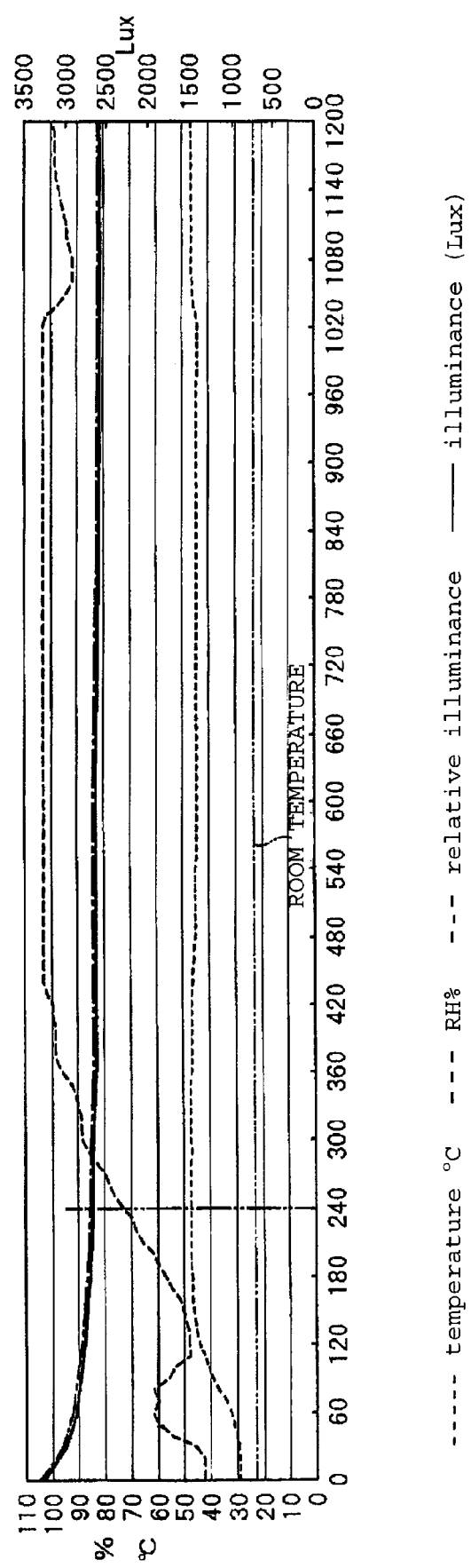
FIG. 16 is a graph showing results in Example 7.

Measurement was made in the same way as that in Example 6 except that in a combination of the building material (2), the light source lamp 71 and the light meter 72 in Example 6, the light source lamp 71 was located at a position just above the center in the outer frame, and the light meter 72 was located at a position just under the center of the outer frame as shown in FIG. 9 (in other words, the incident angle of light into the building material (2) was set an angle of 45°). A graph was prepared to show changes in the temperature and the RH in the membranes, and changes in the illuminance and the relative illuminance measured by the light meter 72 since the start of humidified air supply. The graph is shown in FIG. 16.

The relative illuminance started decreasing just after the start of humidified air supply. In 240 sec, the relative illuminance decreased by about 20% in comparison with the relative illuminance at the start of supply. After that, the relative illuminance was kept almost constant.

The changes in the RH and the temperature in the membranes, and the flows of dew condensation had an almost similar tendencies as those in Example 6.

The above-mentioned measurement result reveals that Examples 1 to 7, where humidified air, which was able to generate dew condensation on the gap-side surfaces, was supplied, achieved a light-blocking rate beyond 50% at the maximum. It was also affirmed that the time period required for dew condensation was able to be controlled by adjusting the temperature of humidified air, the amount of vapor, etc.

It was also affirmed that the light-blocking rate was able to be changed by adjusting the amount of vapor supplied into the gap (the relative humidify, etc.), the inclination angle of a building material to incident light, etc.

From this point of view, in, e.g., a case where a building material having a similar structure to the above-mentioned building materials (1) and (2) is used as a roof, it is supposed that the light-blocking rate can be controlled in the range of from 0 to 40+α (%) by adjusting the inclination of the room, the supply amount of vapor, etc., since the roof used for a building, such as a house for cultivating plants, is actually inclined with respect to the sunlight.

When humidified air is supplied into the gap between adjacent transparent sheet layers in the building material according to the present invention, vapor is filled in the gap, and dew condensation is caused on a gap-side surface between adjacent transparent sheet layers, exhibiting a light-blocking effect.

Since it is possible to obtain a light-blocking effect without use of a shade curtain, it is possible to eliminate a shading member over the ceiling of a house. Accordingly, it is possible to solve the problem caused by using a shade curtain (for example, the installation of a shade curtain in a house for cultivating plants is unfavorable against plant cultivation since the shade curtain prevents sunlight from entering the roof, constantly makes the inside of the house dark and makes the amount of light nonuniform from portion to portion. The maintenance of the system for the shade curtain is also required).

In accordance with the present invention, the outer side (such as a roof, a wall and a window) of a building can be configured to be good at transparency without having anything to block light, and the building can be realized as a house an extremely neat appearance (having no curtain). In particular, when humidified air is supplied by using a transparent transport pipe (such as a tube made of a fluororesin, such as ETFE), it is possible to reduce the area of shade in the building.

In particular, when the transparent sheet layers contain a fluororesin, dew condensation is more likely to be caused, further improving the effect of the present invention. Also in this case, it is not necessary to exchange the transparent sheet layers for new ones until a dozen years pass, because the fluororesin is excellent in weatherability, resistance to UV light, mechanical strength, etc.

In accordance with the present invention, it is possible to control the light-blocking rate by adjusting the temperature of humidified air and/or the amount of vapor, the inclination angle of the building material with respect to a light source, etc.

The building material according to the present invention has an excellent heat insulation performance because of having a high heat-ray absorption capacity. For this reason, a building including the building material according to the present invention is excellent in thermal insulation property. Accordingly, in accordance with the present invention, it is possible to restrain the radioactive cooling at night in a building in both the winter and the summer by supplying humidified air at a high temperature. When the vapor in the gap, which has absorbed a heat-ray, is recovered, it is possible to restrain the temperature in the building from increasing.

The building material according to the present invention is applicable to the roof, the walls, the windows and the like of various kinds of buildings, such as a house for cultivating plants (e.g., an agricultural greenhouse and a greenhouse for gardening), a barn for breeding livestock, a sport facility (e.g., a gymnasium, a swimming pool, a tennis court, a soccer stadium, a baseball park) and a sunroom. The building material according to the present invention is properly applicable to a house for cultivating plants since shade, which has a particularly significant effect on the growth of plants in the house, is hardly to be created.

The entire disclosure of Japanese Patent Application No. 2006-156420 filed on Jun. 5, 2006 including specification, claims, drawings and summary is incorporated herein by reference in its entirety.

What is claimed is:

1. A method for controlling the indoor environment in a building comprising:
    providing the building including,
        a plurality of adjacent transparent sheet layers forming a portion of a roof, wall, or window, the transparent sheets forming a gap interposed therebetween, and
        a vapor supply system for supplying humidified air into the gap between the adjacent transparent sheet layers;
    supplying humidified air into the gap between adjacent transparent sheet layers and actively managing the supplying humidified air; and
    generating dew condensation on a gap-side surface of at least one of the adjacent transparent sheet layers.

2. The method according to claim 1, further comprising: adding to the humidified air a gas having a heat-ray absorption capacity.

3. The method according to claim 1, further comprising: determining an outdoor temperature of the building, and wherein the humidified air has a temperature ranging from the outdoor temperature of the building plus 10° C. to the outdoor temperature of the building plus 70° C.

4. The method according to claim 1, further comprising adjusting a number of gap-side surfaces subjected to no hydrophilic treatment among the gap-side surfaces of the transparent sheet layers, thereby controlling an amount of dew condensation on the gap-side surfaces.

5. The method according to claim 1, further comprising: adjusting an inclination angle of the transparent sheet layers with respect to incident light from outside the building, thereby controlling an incident angle of the incident light on the transparent sheet layers.

6. The method according to claim 1, wherein the building comprises a house for cultivating a plant.

7. The method according to claim 1, wherein the gap-side surface has a water contact angle of 60 degrees or greater.

8. The method according to claim 1, wherein a width of the gap between the adjacent transparent sheet layers is from 1 to 50cm.

9. The method according to claim 1, further comprising: controlling the amount of light entering the building from outside the building by controlling the amount of dew condensation on the gap-side surfaces of the transparent sheet layers.

10. The method according to claim 1, further comprising: controlling a temperature in the building by controlling an amount of water vapor in the gap.

11. The method according to claim 1, further comprising: controlling the amount of light entering the building from outside the building by controlling the humidified air supplied to the gap.

12. The method according to claim 1 wherein the transparent sheet layers contain a fluororesin.

13. The method according to claim 1 wherein the transparent sheet layers comprise an ethylene/tetrafluoroethylene copolymer.

14. A method for controlling the indoor environment in a building comprising:
    providing the building including,
        a plurality of adjacent substantially parallel transparent sheet layers which form a gap having a width of from 1 to 50cm interposed therebetween, and
        a vapor supply system for supplying humidified air into the gap between the adjacent transparent sheet layers;
    supplying humidified air into the gap between adjacent transparent sheet layers and actively managing the supplying humidified air; and
    generating dew condensation on a gap-side surface of at least one of the adjacent transparent sheet layers.

15. The method according to claim 14, wherein the gap-side surface has a water contact angle of 60 degrees or greater.

16. The method according to claim 14, further comprising: controlling a heat-insulating effect of the building by controlling an amount of water vapor in the gap.

17. The method according to claim 14, further comprising: adding to the humidified air a gas having a heat-ray absorption capacity.

18. The method according to claim 1, wherein the actively managing the supplying humidified air into the gap between the adjacent transparent sheet layers further comprises at least one from a group consisting of selecting a temperature, selecting a relative humidity, and selecting a flow rate of the humidified air being supplied.

19. The method according claim 1, wherein the actively managing the supplying humidified air and the generating dew condensation decreases a relative illuminance through the transparent sheets by at least 10% as compared to a relative illuminance at a start of the supplying humidified air,
    wherein the relative illuminance is measured according to a procedure comprising:
    placing a light source on one side of the plurality of transparent sheet layers,
    placing a light meter on an opposite side of the plurality of transparent layers so that a straight line connecting a light emitting portion of the light source to a sensor of the light meter passes through a center of an outer frame for the plurality of transparent sheet layers in a direction perpendicular to a plane defined by the outer frame, and so that a distance between the light emitting portion of the light source the center of the frame is 450mm and a distance between the sensor of the light meter and the center of the frame is 320mm.

20. The method according to claim 14, wherein the actively managing the supplying humidified air into the gap between the adjacent transparent sheet layers further comprises at least one from a group consisting of selecting a temperature, selecting a relative humidity, and selecting a flow rate of the humidified air being supplied.

21. The method according claim 14, wherein the actively managing the supplying humidified air and the generating dew condensation decreases a relative illuminance through the transparent sheets by at least 10% as compared to a relative illuminance at a start of the supplying humidified air,
    wherein the relative illuminance is measured according to a procedure comprising:
    placing a light source on one side of the plurality of transparent sheet layers,
    placing a light meter on an opposite side of the plurality of transparent layers so that a straight line connecting a light emitting portion of the light source to a sensor of the light meter passes through a center of an outer frame for the plurality of transparent sheet layers in a direction perpendicular to a plane defined by the outer frame, and so that a distance between the light emitting portion of the light source the center of the frame is 450mm and a distance between the sensor of the light meter and the center of the frame is 320mm.

* * * * *